US010608372B2

(12) United States Patent
Brierley

(10) Patent No.: US 10,608,372 B2
(45) Date of Patent: Mar. 31, 2020

(54) CONNECTOR UNIT AND METHOD

(71) Applicant: Siemens Aktiengesellschaft, Munich (DE)

(72) Inventor: Alexander Brierley, Askam-In-Furness (GB)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/317,557

(22) PCT Filed: Jul. 18, 2017

(86) PCT No.: PCT/EP2017/068168
§ 371 (c)(1),
(2) Date: Jan. 13, 2019

(87) PCT Pub. No.: WO2018/015408
PCT Pub. Date: Jan. 25, 2018

(65) Prior Publication Data
US 2019/0296478 A1    Sep. 26, 2019

(30) Foreign Application Priority Data

Jul. 19, 2016 (EP) .................................. 16180156

(51) Int. Cl.
*H01R 13/523* (2006.01)
*H01R 43/26* (2006.01)
*G02B 6/38* (2006.01)

(52) U.S. Cl.
CPC ......... *H01R 13/523* (2013.01); *G02B 6/3816* (2013.01); *H01R 43/26* (2013.01)

(58) Field of Classification Search
CPC .. H01R 13/523; H01R 13/533; H01R 11/284; H01R 43/26; G02B 6/3885;
(Continued)

(56) References Cited

U.S. PATENT DOCUMENTS 4,682,848 A   7/1987  Cairns et al.
5,838,857 A   11/1998 Niekrasz
(Continued)

FOREIGN PATENT DOCUMENTS

EP   1657576 A2   5/2006
EP   3168662 A1   5/2017
EP   3211466 A1   8/2017

OTHER PUBLICATIONS

International search report and written opinion dated Oct. 30, 2017 for corresponding PCT/EP2017/068168.
(Continued)

*Primary Examiner* — Gary F Paumen
(74) *Attorney, Agent, or Firm* — Beusse Wolter Sanks & Maire, P.A.

(57) ABSTRACT

A connector unit with first and second connector parts. The first connector part has a volume compensating chamber that is pressure compensated against an ambient environment. A contact support element enters a second connector part during mating of the unit. The second connector part has a second volume compensating chamber that is pressure compensated against the ambient environment. The unit has a communication chamber in flow communication with the first volume compensating chamber when in an unmated state and is in flow communication with the second volume compensating chamber when in the mated state. During mating, flow communication between the communication chamber and the first volume compensating chamber is interrupted and the communication chamber is brought into flow communication with the second volume compensating chamber, so that the communication chamber is pressure compensated via the second volume compensating chamber in the mated state.

16 Claims, 14 Drawing Sheets

(58) Field of Classification Search
CPC .. G02B 6/3887; G02B 6/3821; G02B 6/3893; G02B 6/3869; G02B 6/3816
USPC .................. 439/199, 201; 385/53–56, 58, 60
See application file for complete search history.

(56) References Cited

U.S. PATENT DOCUMENTS

| | | | |
|---|---|---|---|
| 6,017,227 A | 1/2000 | Cairns et al. | |
| 6,315,461 B1 | 11/2001 | Cairns | |
| 6,929,404 B2 | 8/2005 | Jones et al. | |
| 7,244,132 B1 * | 7/2007 | Cairns | H01R 13/523 439/191 |
| 7,364,448 B2 * | 4/2008 | Cairns | G02B 6/3816 439/201 |
| 7,530,744 B2 * | 5/2009 | Prel | G02B 6/3816 385/53 |
| 7,618,198 B2 | 11/2009 | Baxter et al. | |
| 8,226,303 B2 | 7/2012 | Toth | |
| 8,827,570 B2 * | 9/2014 | Lagathu | G02B 6/3816 385/52 |
| 8,944,082 B2 | 2/2015 | Cairns | |
| 9,077,099 B1 * | 7/2015 | Hatcher | G02B 6/3816 |
| 9,270,051 B1 * | 2/2016 | Christiansen | H01R 13/523 |
| 9,583,868 B2 * | 2/2017 | McIntosh | H01R 13/521 |
| 9,590,350 B2 * | 3/2017 | Plant | H01R 13/523 |
| 9,742,078 B2 * | 8/2017 | Lewin | H01R 4/20 |
| 9,742,104 B2 * | 8/2017 | Plant | G02B 6/4427 |
| 2009/0080837 A1 | 3/2009 | Baxter et al. | |
| 2011/0129187 A1 | 6/2011 | Toth | |
| 2012/0125460 A1 | 5/2012 | Cairns | |
| 2014/0270645 A1 | 9/2014 | Toth | |

OTHER PUBLICATIONS

EP search report dated Jun. 2, 2017 for corresponding EP patent application No. 16180156.8.

* cited by examiner

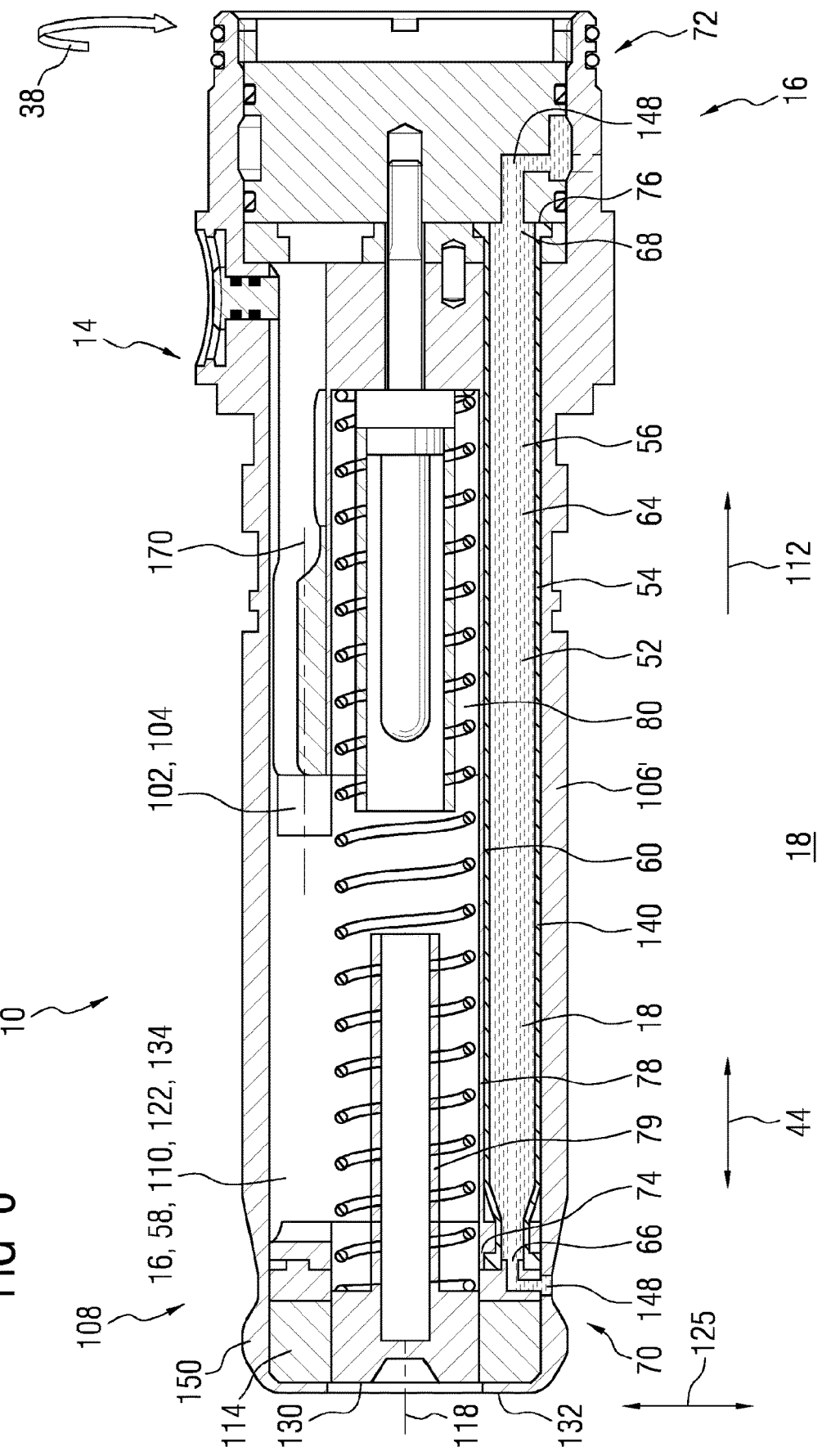

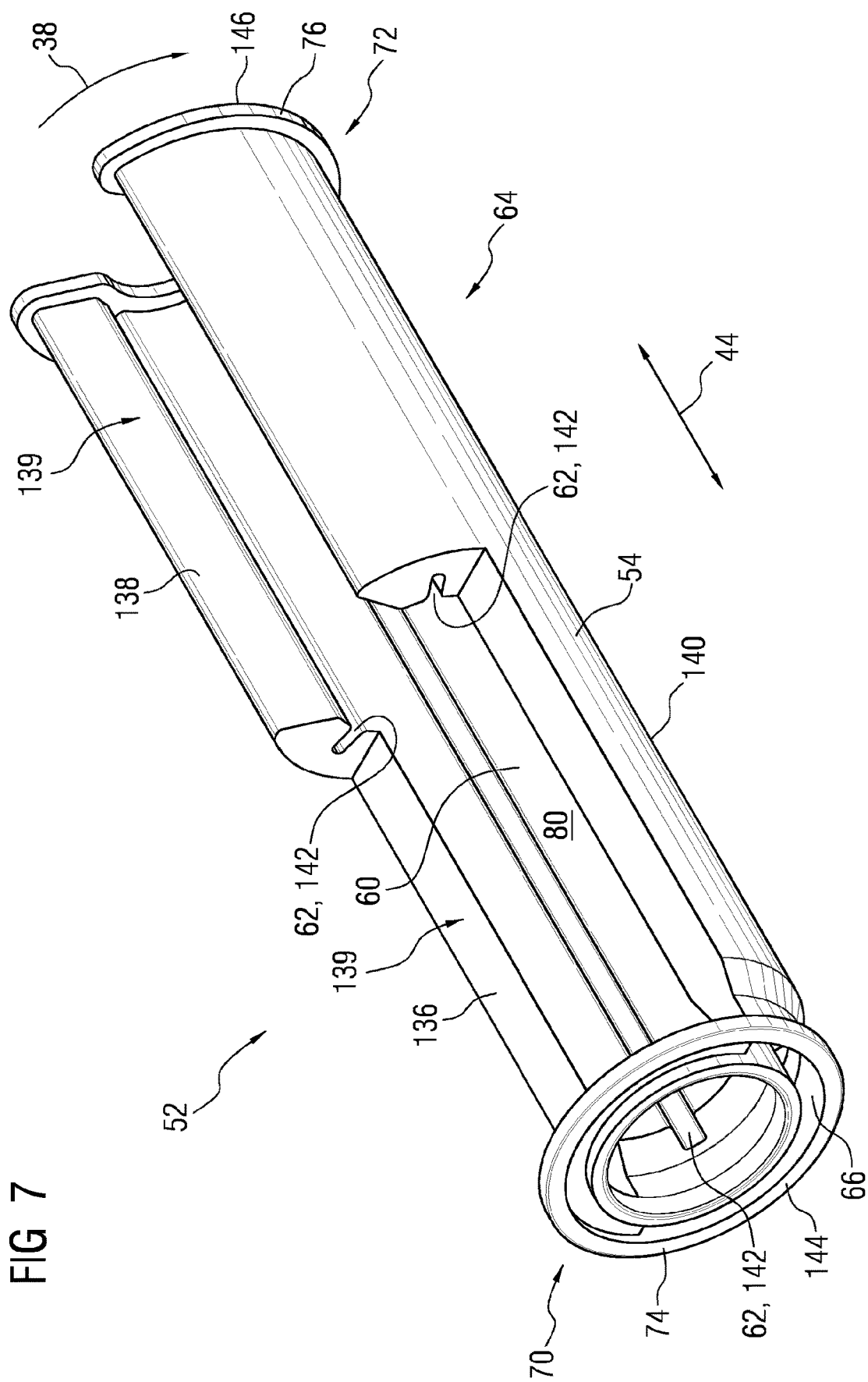

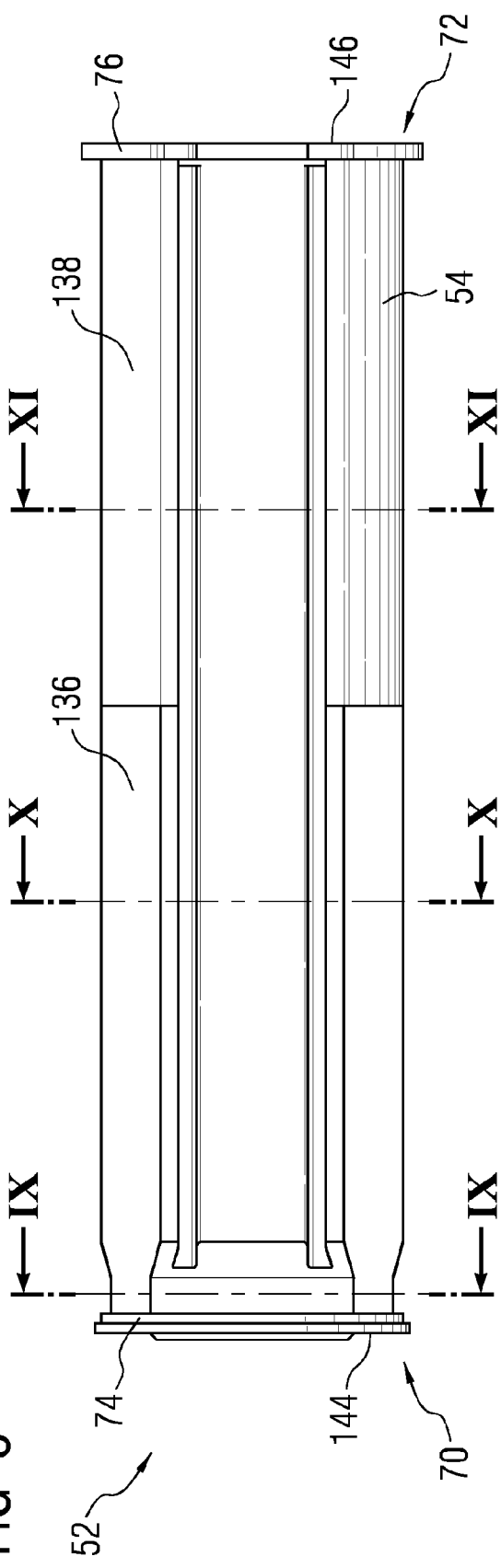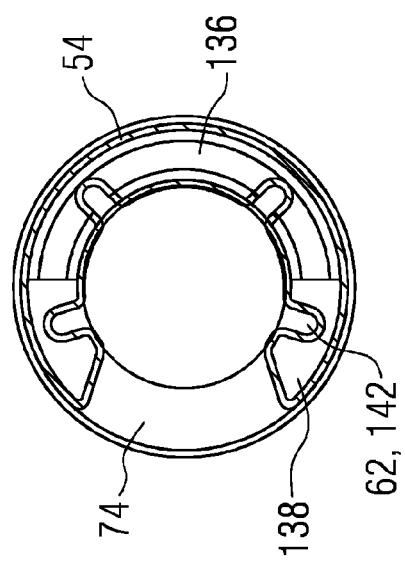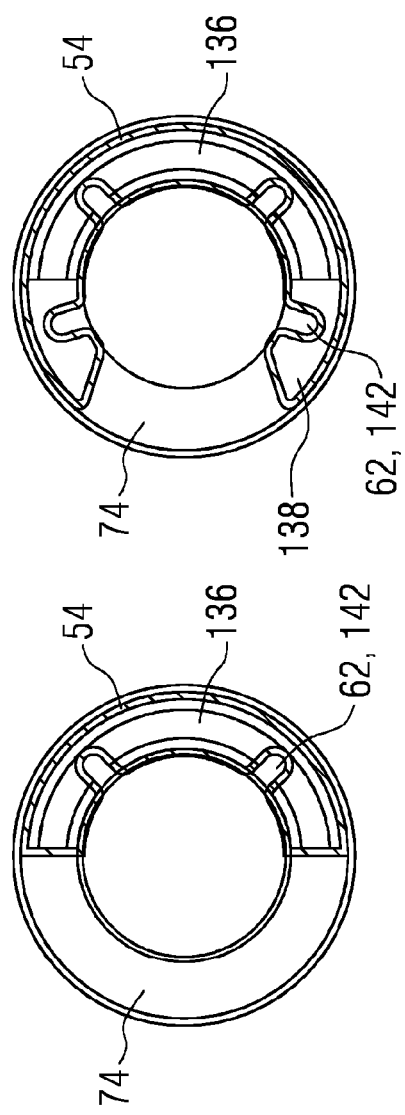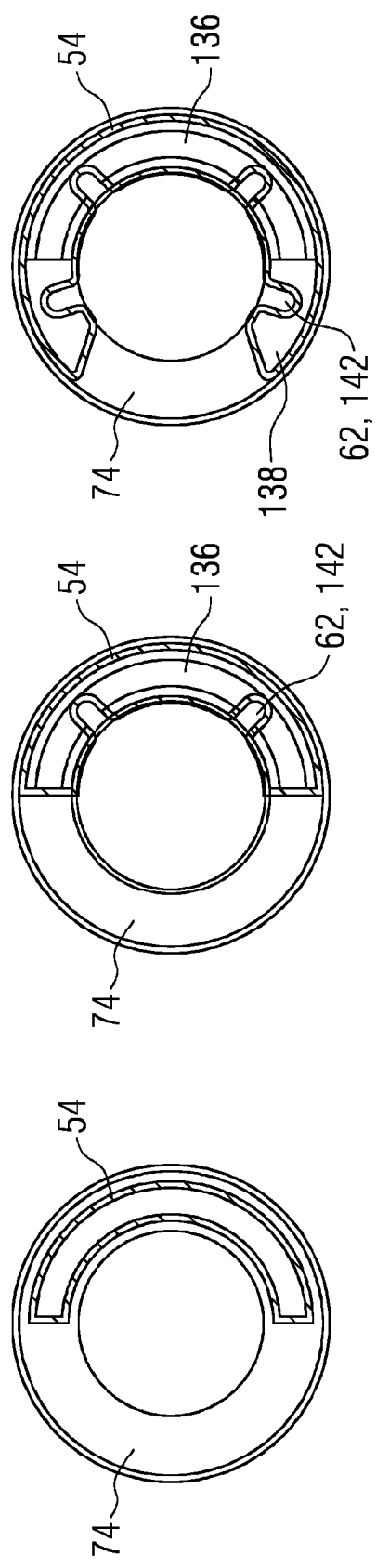

CONNECTOR UNIT AND METHOD

CROSS REFERENCE TO RELATED APPLICATIONS

This application is the US National Stage of International Application No. PCT/EP2017/068168 filed Jul. 18, 2017, and claims the benefit thereof. The International Application claims the benefit of European Application No. EP16180156 filed Jul. 19, 2016. All of the applications are incorporated by reference herein in their entirety.

FIELD OF INVENTION

The present invention relates to a connector unit with first and second connector parts each comprising a volume compensating chamber and to use of such a connector unit, as well as to a method for operating such a connector unit.

BACKGROUND OF INVENTION

Increasing demand for communication over long distances, especially, for example, between continents will require infrastructure, such as subsea cables and connectors linking subsea cables and modules, e.g. subsea modules, such as transformers, pumps etc., that are located and operated reliably subsea. For example, in the oil and gas industry there is an increasing requirement for high performance subsea optical connectors.

Fibre optics are known for use in subsea connectors. Such an optical fibre is capable of carrying large volumes of data reliably and with minimal interference (such as from electromagnetic sources that would potentially effect traditional electronic transmissions). Due to the size and fragile nature of the contacting faces of the fibre optic ferrules, they must be protected from harsh conditions. They are extremely susceptible to damage from particles being trapped between the mating faces.

To isolate the internal parts and the optical contacts of the connector parts of such a connector from salt water and debris, as well as to support the mating of the female part with a male part of the connector, chambers of the connector parts are filled with an lubricant or compensation medium (oil, silicone gel etc.). With electrical connectors, the lubricant may also provide electrical insulation, although this is not a particular requirement for fibre optic connectors. During the mate, or due to thermal variances, a part of the lubricant will be displaced e.g. pushed into a volume compensator. For example, current compensation systems use elastomeric diaphragms as a barrier and as a means of pressure and thermal compensation between seawater and the connector. The pressure stabilising or compensating medium acts in conjunction with the elastomeric materials. To provide volume compensation during the mating or de-mating of the connector unit, a volume of the diaphragm may be changed by deforming the diaphragm or the compensating medium may be displaced from one connector part to the other connector part taking a route via a rigid walled chamber in a male pin connecting the compensating volumes of the connector parts.

Moreover, in conventional connectors a connecting structure comprising the optical fibre is, for example, positioned in a protecting sleeve during the mate and is only exposed in a clean environment shortly before the initial contacting of the corresponding fibre. To shorten the overall length of the connector and to provide a connector with e.g. several connecting structures and fibres, it is, for example, known to arrange the connecting axis off-centre and transversally from the centre axis of the connector.

Diaphragms used in these arrangements are, for example, arranged around the initials of the respective connector part. Hence, to provide sufficient flexible volumes the compensating volumes or the related structures such as diameter of the diaphragms or dimensions of the chamber in the male pin (such as for example, length, height, diameter etc.) had to be rather large. This results in a large and bulky connector. Furthermore, by compensating the volume by displacing the compensation medium from one connector part to the other connector part there is the risk of losing compensation medium in one connector part by uncompleted or disrupted displacement. Thus, a disturbed mating or un-mating sequence may occur, which may cause the total failure of the connector.

SUMMARY OF INVENTION

According to a first aspect of the present invention, a connector unit, especially for a use in a subsea application, with a first connector part and an at least second connector part is proposed. The first connector part has at least a first volume compensating chamber that is pressure compensated against an ambient environment and at least one contact support element that at least partly enters an at least second connector part of the connector unit during mating of the connector unit. The first connector part also comprises a communication chamber that is in flow communication with the first volume compensating chamber, when the connector unit is in an unmated state. Further, the second connector part has at least a second volume compensating chamber that is pressure compensated against the ambient environment.

The connector unit is configured such that during mating of the first connector part and the second connector part, a flow communication between the communication chamber and the first volume compensating chamber of the first connector part is interrupted and the communication chamber is brought into flow communication with the second volume compensating chamber of the second connector part, so that the communication chamber is pressure compensated via second volume compensating chamber in the mated state of the connector unit.

As a result of this, the majority of the compensation medium (such as oil, silicone gel, grease etc.) remains in one or other connector part in both the unmated and the mated state and in most cases does not move out of its connector part, even during mating of the connector unit. Thus, depletion of compensation medium from the connector part(s) can be avoided, resulting in a reliable and fully functioning connector unit even after several mate and de-mate cycles. Furthermore, the communication chamber is properly pressure balanced in both the unmated and the mated state and hence components located inside the communication chamber, such as the sensitive optical contact, are effectively protected.

The present invention provides a connector unit to address the problems of the prior art and that has a reduced risk of depletion of compensation medium in comparison with state of the art systems and failure and consequently has a high reliability.

The connector unit of the present invention may be used in applications subjected to high standards of reliability.

The method improves mating and de-mating and results in a reliable connected state of the connector unit, thus providing a unit that can be operated reliably, safely and is less insusceptible to errors, in comparison to conventional systems.

Even if the terms "volume compensating chamber, environment, contact support element, communication chamber, passageway, moveable element, opening, contact face, sleeve, contact element, optical contact, pin, volume compensating arrangement, flexible wall, rigid wall, distance, bellows, material, rubber, volume compensating compartment, enclosure, inner volume, section, profile changing element, aperture, end, positioning structure, sealing flange, pin, space, channel, part, segment, membrane and diaphragm" (see also below) are used in the singular or in a specific numeral form in the claims and the specification the scope of the patent (application) should not be restricted to the singular or the specific numeral form. It is also within the scope of the invention to have more than one or a plurality of the above mentioned structure(s).

A connector unit is intended to mean a unit which physically connects at least two parts, such as two cables, advantageously subsea cables, or connects a cable with a, typically subsea, module (for example, a transformer, a pump or other equipment) or a busbar inside the module or modules. Thus, it is advantageously a subsea connector unit. The connector unit may be used in any harsh environment and may be embodied as an optical or an electrical connector and/or penetrator or advantageously as a wet mateable connector/penetrator. The term physically connects should be understood to include the use of any connection feasible for a person in the art, such as optical, electrical or magnetic. However, an advantageous application is an optical application.

Such a connector unit advantageously comprises at least two mateable connector parts that in the embodiment as an optical connector unit each comprise at least one optical fibre, wherein the optical fibre of the first connector part and the optical fibre of the second connector part are embodied in such a way as to establish an optical connection after a mate of the first and second connector part.

Where the connector unit is embodied as an electrical connector unit, the unit may comprise at least a conductor part that helps to establish an electrical connection in a mated position of two connected parts, such as two cables or a cable with a module.

The connector part may be a male part, in other words it may comprise a pin, such as a conductor pin, a receptacle pin or a male pin of a connector or of a penetrator, or the connector part may be a female part, in other words it may comprise an aperture, for example, to receive a pin of the male part and may be a socket contact of a female part, plug or socket or a connector body of a connector for contacting a conductor pin of a male part. Alternatively, the connector unit may comprise a receptacle, generally the female part of a connector system, having a male part, for example comprising a pin, and a plug, generally the male part, having a female element to receive the male pin. Thus, the connector part may be embodied wholly or partially as a male part and/or as a female part. The connector parts of the optical connector unit may comprise male or female parts, for example, if one optical fibre of the first connector part is embodied to pass into a body of the second connector part to connect with the optical fibre of the second connector part.

Hence, the female part may comprise a part of the connector unit with an opening, recess, bore or cavity to receive another part of the connector unit, such as an optical fibre. Moreover, in case of an embodiment of the connector unit comprising a penetrator one optical fibre may be permanently connected to a cable or a module via a housing.

The phrase that the volume compensating chambers are "pressure compensated against an ambient environment" should be understood that pressure changes outside of the volume compensating chambers are transferred to or act on a pressure inside the volume compensating chambers or the pressure a compensation medium inside the volume compensating chambers are having. Moreover, in this case the terms "ambient environment" or "outside" should be understood as outside or around the connector unit. The possibility that cavities inside the connector unit may be filled with a medium, such as seawater, from the environment of the connector unit due to communication channels with the environment should not contradict the provided definition. Hence, the volume compensating chambers are pressure compensatable against seawater. Moreover, the volume compensating chambers provides a pressure adjustment to protect initials of the respective connector part arranged inside the volume compensating chambers or being surrounded by the compensation medium inside the chambers. Both compensating chambers may also pressure compensate another chamber, such as the communication chamber, especially against the ambient environment (e. g. seawater).

A contact support element is intended to mean an element that supports the mating connection between the connector parts and advantageously also the resulting working (e.g. electrical or optical) connection or contact between the connector parts. The contact support element is advantageously the element that facilitates the mate or the de-mate by entering or exiting the second connector part. Hence, the contact support element may be a male pin of a connector part.

A communication chamber is intended to mean a chamber or cavity that is able to communicate or be in flow communication with another chamber or volume. A medium or fluid housed in the respective cavities communicate with one another or are in flow communication with each other. Due to the inventive embodiment the communication chamber can be a part of the first volume compensating chamber of the first connector part (in the unmated state) or of the second volume compensating chamber of the second connector part (in the mated state). However, there is also a state during the mating of the connector parts in which the communication chamber is separated/isolated from or not in communication with the first volume compensating chamber of the first connector part and the second volume compensating chamber of the second connector part. Since a contact element may be housed or disposed inside the communication chamber it may be also named contact element chamber.

According to a realisation of the invention the connector unit or the first connector part, respectively, may comprise at least a first passageway connecting the first volume compensating chamber and the communication chamber. The term "connect" should be also understood as "arranged between". The separation of the chambers from one another may be done easily when the flow communication between the communication chamber and the first volume compensating chamber is interrupted by closing the first passageway connecting the first volume compensating chamber and the communication chamber during the mating of the first connector part and the second connector part.

Moreover, the connector unit may comprise at least a second passageway connecting the second volume compensating chamber and the communication chamber in the mated state of the connector unit. The communication between the communication chamber and the second volume compensating chamber may be established easily when the communication chamber is brought into flow communication with the second volume compensating chamber by opening the second passageway connecting the communication chamber and the second volume compensating chamber during the mating of the first connector part and the second connector part.

In an embodiment of the invention, the connector unit or the first connector part, respectively, comprises an at least first moveable element that is arranged at a first position in the unmated state of the connector unit, and is moved to a second position during the mating of the first connector part and the second connector part, wherein in the second position, the first moveable element seals the first passageway connecting the first volume compensating chamber and the communication chamber to provide said separation between the first volume compensating chamber and the communication chamber in the mated state of the connector unit. Hence, the separation of the communication chamber can be triggered easily by acting on the first moveable element.

Advantageously, the connector unit or the first connector part, respectively, comprises an at least second moveable element. Thus, the opening and closing of the communication chamber can be done in at least a two-step sequence moving both moveable elements one after the other. This ensures a secure and fine-tuned operation.

The second moveable element may be arranged at a first position in the unmated state of the connector unit, wherein in this first position the second moveable element closes the second passageway. In that configuration a solid part of the second moveable element may—radially—cover the second passageway. Moreover, the second moveable element is moved to a second position during the mating of the first connector part and the second connector part, wherein in the second position, the second moveable element opens the second passageway or in other words the second passageway is opened by a movement of the second moveable element. Hence, said flow communication between the second volume compensating chamber and the communication chamber in the mated state of the connector unit is provided.

It may be further provided, that the first moveable element comprises a first opening and that the second moveable element comprises at least a second opening and wherein the first passageway is formed by the first opening and the second opening in the unmated state of the connector unit. Hence, in the unmated state the moveable elements are positioned in such a way that the first and the second openings are arranged aligned, specifically axially, with each other. Consequently, the first passageway can be realised with simple means. The first passageway may be sealed easily when the second opening of the second moveably element is closed by a movement of the first moveable element during the mate of the connector unit. In that configuration a solid part of the first moveable element may—radially—cover the second opening of the second moveable element.

Further, the second opening of the first passageway and the solid part that covers the second passageway in the unmated state are embodied in the same component, namely, the second moveable element. Due to this fixated spatial arrangement the closing of the first passageway and the opening of the second passageway during the mate of the connector unit can occur according to a predefined and highly reproducible manner.

Furthermore, the communication chamber comprises at least one outer wall or an inner volume/cavity of the communication chamber is surrounded by at least one outer wall. A space-saving arrangement can be realised when the second passageway is embodied as an aperture in the outer wall. An outer wall is intended to mean a wall separating an inner volume of the communication chamber from an outer volume of the communication chamber, wherein the outer volume is advantageously the volume of the first volume communication chamber.

The moveable elements may be embodied in any way feasible for a person skilled in the art, such as a ring, a cover, a half-shell or advantageously a sleeve. Moreover, the movement may be any movement feasible for a person skilled in the art, such as a rotation, a swinging motion or advantageously a sliding motion. Hence, both moveable elements are advantageously sliding elements. Moreover, both moveable elements are spring biased in there forward position in the unmated state of the connector unit. During the mate each moveable element is pushed back against the respective spring. Moreover, the springs have different spring rates, and specifically, the spring that activates the second moveable element or the inner sleeve has a higher spring rate (i.e. exerts more resistance to being compressed) than the spring that activates the first moveable element or the outer sleeve. This allows control over the order in which the first and second moveable elements activate, move or slide back during the de-mate.

Both moveable elements are advantageously embodied as sleeves that are arranged coaxially towards each other and towards the axis of the first connector part. Furthermore, the second moveable element may be arranged radially inside the first moveable element and this provides a space saving and compact arrangement.

Moreover, the first moveable element and/or the second moveable element may at least partially surround(s) the contact support element. Advantageously, both extend all around a circumference of the contact support element or specifically, the contact or male pin.

As stated above, the contact support element may be a pin of the first connector part. The different situations of flow communication of the communication chamber may be easily realised when the communication chamber is arranged inside the pin due to the entering or exiting of the pin into or from the second connector part.

Moreover, the first connector part comprises the first moveable element that may comprise a sleeve. The sleeve is moveable on the pin to seal the first passageway that provides the flow communication between the communication chamber and the first volume compensating chamber during the mate of the connector unit. Hence, the separation of the communication chamber and the first volume compensating chamber can be done easily by moving the sleeve relative to and on the pin.

Further the first connector part may comprise the second moveable element embodied as a sleeve that is moveable on the pin to open the second passageway that provides the flow communication between the communication chamber and the second volume compensating chamber during the mate of the connector unit. Thus, by moving the sleeve relative to and on the pin the flow communication between the communication chamber and the second volume compensating chamber can be easily established.

Further, the first connector part may comprise at least one contact face that contacts the second connector part during the mating of the first connector part and the second connector part. Hence, the mating force can be transferred effectively between the connector parts. To transfer the mating force directly to the first moveable element it is embodied moveably with the contact face. The contact face is advantageously a front face of the first connector part. The most convenient solution for this is when the first moveable element and the contact face are formed integrally with each other. The phrase "formed integrally with each other" should be understood in that the contact face and the moveable element are embodied as a one-piece part or in that they can only be separated from each other with damaging at least one or both of the parts or with loss of function for at least one or both of the parts.

Hence, a movement of the moveable elements is mediated or triggered by the mate or de-mate of the connector unit.

The connector unit may further comprise a first contact element and at least a second contact element to establish a communication or electrical connection after the mate of the connector parts.

According to a further aspect of the present invention the first contact element may be disposed in the communication chamber of the contact support element or the contact pin and thus in the first connector part. Hence, the contact element is protected in the unmated state and during the mate or the de-mate of the connector unit. Moreover, the second contact element is disposed in the second volume compensating chamber of the second connector part. The contact element may provide any way of contact feasible for a person skilled in the art, such as electrical, magnetic or advantageously optical. Advantageously, the first contact element and/or the second contact element comprise(s) a least an optical contact or fibre. The optical fibre may be a part of a ferrule that may be of any type or construction feasible for a person skilled in the art. Thus, it would be possible to use a multi-fibre-optical ferrule or to use an "individual" ferrule that e.g. houses only one optical fibre which is aligned with another ferrule using a split sleeve and is not gender specific. Moreover, a number of optical fibres can be selected according to the needed specifications of the connector unit and can be any number feasible for a person skilled in the art. Hence, it is also possible to employ one ferrule with more than one optical fibre, e.g. 12 or 24, or several ferrules, e.g. 8 or more, with just one optical fibre.

In an unmated state of the first connector part with the second connector part of the connector unit, the communication chamber of the contact support element of the connector part is in flow communication with and pressure balanced against the first volume compensating chamber of the connector part and in the mated state of the connector part with the second connector part, a flow communication between the communication chamber and the first volume compensating chamber of the first connector part is interrupted.

Thus, the majority of compensation medium is stationary in the connector part in the unmated, the mated state and even during the mate of the connector unit. Thus, a depletion of compensation medium for the connector part can be avoided, resulting in a reliable and fully functioning connector unit even after several mate and de-mate cycles. Furthermore, the communication chamber is properly pressure balanced the unmated state and hence components located inside the communication chamber, such as the sensitive optical contact, are effectively protected.

According to a still further aspect of the present invention a use of the described connector parts and the connector unit, respectively, in a subsea application is proposed. Hence, a reliable connector part or unit can be applied in an environment where high reliability standards are essential.

The invention further relates to a method for operating the above described connector unit that comprises the first connector part, the latter having the first volume compensating chamber and the communication chamber, and further comprising the second connector part, having the second volume compensating chamber.

The method comprises at least the steps of: closing a connection—the first passageway—between the first volume compensating chamber and the communication chamber, thus preventing/interrupting a flow communication between the first volume compensating chamber and the communication chamber and subsequently, opening a connection—the second passageway—between the second volume compensating chamber and the communication chamber, thus allowing a flow communication between the second volume compensating chamber and the communication chamber so that the communication chamber is pressure compensated via the second volume compensating chamber in the mated state of the connector unit.

Due to this method, the majority of compensation medium is stationary in its respective connector part in the unmated, the mated state and even during the mate of the connector unit. Thus, a depletion of compensation medium for the connector part(s) can be avoided, resulting in a reliable and fully functioning connector unit even after several mate and de-mate cycles. Furthermore, the communication chamber is properly pressure balanced in both the unmated and the mated state and hence components located inside the communication chamber, such as the sensitive optical contact, are effectively protected.

It is further proposed that the method comprises the further steps of: moving the first moveable element and thus closing the first passageway between the first volume compensating chamber and the communication chamber preventing flow communication between the first volume compensating chamber and the communication chamber and subsequently, moving the second moveable element and thus opening the second passageway between the second volume compensating chamber and the communication chamber allowing flow communication between the second volume compensating chamber and the communication chamber so that the communication chamber is pressure compensated via the second volume compensating chamber in the mated state of the connector unit.

Hence, the state of flow communication for the communication chamber can be determined easily by moving the moveable elements providing an actuation system that can be conveniently operated by the mate or de-mate of the connector unit.

In a fifth aspect to a connector part of a connector unit, especially for a use in a subsea application, may comprise at least one volume compensating arrangement that is pressure compensated against an ambient environment, wherein the volume compensating arrangement comprises the first volume compensating chamber encasing a first volume and at least a third volume compensating chamber encasing at least a second volume and wherein the first volume compensating chamber and the third volume compensating chamber are in flow communication with each other, wherein the first volume compensating chamber comprises at least a first flexible wall and wherein the third volume compensating chamber comprises at least a second flexible wall, wherein the first flexible wall at least partially encases the first volume and the second flexible wall at least partially encases the second volume and wherein the first volume is variable by deforming the first flexible wall and the second volume is variable by deforming the second flexible wall.

Thus, flexible volume compensation can be provided. Moreover, a size of the connector part and thus of the whole connector unit may be reduced in comparison with conventional systems, resulting in a compact connector part and unit. Furthermore, a connector unit with a long stroke length can be provided.

Thus, a flexible, space efficient volumetric, pressure and/or temperature volume compensating arrangement can be provided that can be advantageously used in subsea applications such as wet mateable connectors or penetrators.

A volume compensating arrangement is intended to mean a device, structure or system embodied to compensate changes in a volume of a compensation medium or lubricant (oil, silicone gel, grease etc.) for example due to pressure or thermal expansion or contraction. Such a volume compensating arrangement may be arranged or integrated in any area of the connector unit or part where compensation is required. Advantageously, the male part and the female part each comprise a volume compensating arrangement.

It may be possible that only one of the chambers of the volume compensating arrangement is pressure compensated. Advantageously, both volume compensating chambers are directly pressure compensated against the ambient environment and specifically, against seawater. Thus, the first and the third volume compensating chamber are pressure compensated against seawater in an operable state of the connector part or unit, respectively. Since the volume compensating chambers are in flow communication with each other they are pressure balanced against each other.

The following explanations or features stated in reference to a volume communicating chamber refer to, if not otherwise states, the first and third volume communicating chamber. A volume compensating chamber should be understood as a cavity with at least one surrounding wall and the phrase "encasing a volume" should be understood in that the at least one wall of the chamber restricts a volume or that the chamber takes up a volume. Openings connecting the chamber with other parts of the volume compensating arrangement should not contradict this definition. The term "encase" should be also understood as "enclose, surround or restrict". Moreover, the first volume compensating chamber and the third volume compensating chamber are filled with compensation medium, such as oil, silicone gel, grease etc. Furthermore, the phrase "in flow communication with each other" should be understood in that compensation medium housed in either chamber of the volume compensating arrangement is free to flow into another chamber of the volume compensating arrangement. The second volume compensated chamber of the second connector part is not part of the volume compensating arrangement of the first connector part and thus is never in direct flow communication with the first and third volume compensating chambers.

A flexible wall is intended to mean a wall that is able to change or adjust its shape or is reversibly deformable e.g. due to an external stimulus such as a pressure or volume change. The flexible wall is embodied in such a way to allow an adjustment of a volume of the chamber, especially, caused by pressure and temperature variances or expansion and contraction. The ability of the flexible wall to change its shape or deform may be achieved by any means or mechanism feasible for a person skilled in the art, e.g. a stretching or shrinking of its material or a change of a relative configuration of different sections of the wall towards each other, such as a folding or unfolding of a collapsible structure or a smoothing of an uneven contour. The term "flexible" should not be understood as a total displacement of the wall.

The phrase "partially encase" should be understood that the flexible wall is a part of a wall or walls surrounding the chamber volume. To have sufficient effect on volume compensation the flexible wall represents at least 20% of the wall(s) encasing the chamber volume, advantageously at least 30% and most advantageously at least 40%. The term "variable" should also mean changeable or adjustable. Hence, the volume of the volume compensating chamber can be changed or varied.

Since the volume compensating chambers are in flow communication with each other and due to the flexible walls a volume change of one volume compensating chamber can be transferred to the other volume compensating chamber. Thus, when the volume of one volume compensating chamber is reduced (e.g. the first chamber) the volume of the other volume compensating chamber (e.g. the third chamber) will be enlarged. In other words, one volume compensating chamber is adapted to receive and/or to take up at least parts of the compensation medium or lubricant from the other volume compensating chamber. Thus, the total volume compensated in the first connector part is the combined volumes of both the first and third volume compensating chambers.

This can be easily accomplished when the third volume compensating chamber is arranged outside of the first volume compensating chamber. The term "outside" shout be understood as not located in the compensation medium inside the first volume compensating chamber or not surrounded by the compensation medium. Due to this arrangement the vice versa volume change can occur. In case of a positioning of one volume compensating chamber inside the compensation medium of the other volume compensating chamber an enlargement of the inner volume compensating chamber would disadvantageously result in an enlargement of the outer volume compensating chamber.

The first and third volume compensating chamber may be connected by at least one connecting channel. Due to this the flow of compensation medium can be easily led from one volume compensating chamber to the other. An embodiment of the connecting channel or its characteristics, such as its path, shape, dimension etc., may be selected according to the needs of the connector unit. For example, calculation may be made based on a maximum mate speed of the connector parts—i.e. how quickly a remotely operated vehicle may mate the connector parts together. From this a flow rate may be calculated. The at least one connecting channel or port may be sized to allow this flow rate without restriction.

Furthermore, it is provided that the third volume compensating chamber further comprises a rigid wall that also at least partially encases the second volume. Thus, a volume change can occur solely in regions encased by the second flexible wall. The wall may be any wall feasible for a person skilled in the art. Advantageously, the rigid wall is a wall of a housing of the connector part. Hence, the positioning of the third volume compensating chamber can be realised stationary in respect to further structures of the connector part. According to a further realisation of the invention the second flexible wall is arranged radially opposed to the rigid wall. Thus, the volume change is performed in one direction. Moreover, a volume compensation of the third volume compensating chamber is performable by changing a radial distance between the second flexible wall and the rigid wall. Consequently, the compensating action can be done easily. In other words, the second flexible wall is embodied as a radially expandable wall. Advantageously, the second flexible wall is embodied as a flexible membrane or diaphragm. The second flexible wall is advantageously protected from the environment by a cover attached to the housing of the connector part. The cover is attached in such a way, e.g. by forming a channel or having an aperture, so that environmental medium, such as seawater, can flow into a first cavity formed between the second flexible wall and the cover.

Beneficially, the second flexible wall has different radial distances in a circumferential direction of the second flexible wall in reference to an axis of the connector part—at least in an unmated state of the connector unit or in an unexpanded state of the third volume compensating chamber. As a result a change or an enlargement of the second volume can be done effortlessly. In an aspect of the invention the radial distances are deformable due to a volume compensation of the third volume compensating chamber. Hence, a stress-free volume compensation can be realised. In this context, "deformable" may also be understood as smoothable or that a radial difference between the radial distances is varied or reduced during the expansion and enlarged during the contraction of the second flexible wall.

Advantageously, the second flexible wall has in its unexpanded state at least one recess, a first segment and a second segment, wherein the first segment is arranged in circumferential direction beforehand and the second segment is arranged after the recess, wherein the recess has a nearer radial distance to the axis of the connector part than the first segment and the second segment. Thus, the expansion can be performed easily by changing the radial distance of the recess in respect to the axis or the flanking segments or by pushing the recess outwardly. The expansion can be performed homogeneously when the second flexible wall has several recesses—evenly—distributed along a circumference of the second flexible wall. Thus, the second flexible wall may have in at least in an unexpanded state a wave-like contour in circumferential direction or the contour of a standing or circular wave.

The first volume of the first volume compensating chamber can be realised especially flexible, when the first flexible wall of the first volume compensating chamber is embodied as a concertina-like bellows extending in an axial direction of the connector part. Advantageously, a volume compensation of the first volume compensating chamber is performable by folding or unfolding the concertina-like bellows. This results in that the difference in size of the first volume in the expanded state of the bellows (unfolded) versus its unexpanded state (folded) can be at its maximum. Due to this, a connector unit with a large stroke length can be realised.

Moreover, the function of the bellows is to encapsulate the workings of the connector part within compensation medium, whilst allowing the sliding sleeves to move (details see above).

The first and third volume compensating chambers or their flexible walls may be arranged in any configuration feasible for a person skilled in the art, such as one radially over the other, one axially after the other or one around the other. An advantageous compact arrangement and thus connector part can be provided, when the second flexible wall surrounds the first flexible wall at least partially radially outwardly and especially, at least partially in circumferential direction. Advantageously, the first flexible wall and the second flexible wall are arranged concentrically towards each other.

A protected arrangement of the first volume compensating chamber can be realised when it is arranged in a housing of the connector part. An outer wall of the housing surrounds the first volume compensating chamber or the first flexible wall radially and in circumferential direction. A space between the outer wall of the housing and the first flexible wall or the bellows, respectively, provides a second cavity that is fillable via e.g. a channel in the outer wall with environmental medium, such as seawater. Advantageously, the outer wall of the housing is the rigid wall of the third volume compensating chamber providing a space saving and compact arrangement.

The first and second flexible wall(s) may be out of any material feasible form a person in the art, such as a flexible thermoplastic or an elastomer, such as rubber. The volume compensation or the expandability of the volume compensating chambers can be performed easily when the first flexible wall and/or the second flexible wall comprise an elastomeric material. Especially good performances were found when the first flexible wall and/or the second flexible wall comprise silicone rubber.

The connector part comprises at least one contact pin comprising a communication chamber and a contact element disposed in the communication chamber of the contact pin. Advantageously, the first volume compensating chamber is arranged around the contact pin in an unmated state of the connector unit. Thus, the contact pin and its associated structures can be protected from the environmental fluid effortlessly. Moreover, this provides a compact arrangement. Furthermore, the communication chamber is in flow communication with the first volume compensating chamber in an unmated state of the connector unit. Hence, a volume of the communication chamber or the compensation medium inside can be pressure balanced against or via the first volume compensating chamber. In the unmated state of the connector unit the communication chamber is a part of the volume compensating arrangement of the first connector part and the first volume compensating chamber.

Advantageously, the connector part is embodied as a male part of the connector unit.

According to a sixth aspect of the present invention, a connector part of a connector unit, especially for a use in a subsea application, may be provided, wherein the connector part comprises at least one volume compensating arrangement that is pressure compensated against an ambient environment, wherein the volume compensating arrangement comprises at least one volume compensating compartment, wherein the volume compensating compartment comprises at least one enclosure encasing/enclosing an inner volume of the volume compensating compartment and wherein the enclosure is embodied flexible.

Thus, a flexible volume compensation can be provided. Moreover, a size of the connector part and thus of the whole connector unit can be reduced in comparison with state of the art systems resulting in a compact connector part and unit. Furthermore, a connector unit having an off-centre connecting axis can be provided.

All definitions given above and especially, referring to the connector unit, the connector part, the volume compensating arrangement and to the term encase also apply here. Moreover, a volume compensating compartment is intended to mean a component formed or built separately from a part and especially from a housing of the connector part that is able to provide volume compensation especially due to its deformation. The volume compensating compartment could comprise several parts, which are securely connected towards each other in a mounted state of the volume compensating compartment in the connector part. Advantageously, the volume compensating compartment is a one piece part e.g. moulded out of one material. Hence, pieces, mounting efforts and costs can be saved. Moreover, a positioning of functional sections of the volume compensating compartment can be fixated to one another. The volume compensating compartment forms a three-dimensional structure that is basically hollow and that can function as a bladder or a balloon.

An enclosure is intended to mean at least one wall forming the volume compensating compartment and surrounding an inner volume of the volume compensating compartment. An aperture providing access to the inner volume of the volume compensating compartment should not contradict the definition of the term "encase". Furthermore, an inner volume of the volume compensating compartment is intended to mean a volume of the volume compensating compartment that is separated by the enclosure from its environment and in an assembled state in the connector part from structures of the from structures of the connector part, such as internals or especially compensation medium inside the connector part. Thus, the inner volume is restricted by an inner surface of the enclosure.

The term "flexible" should be understood as reversibly deformable or an ability to change/adjust its shape. Thus, the enclosure or sections thereof is/are able to change its/their shape in all directions, axially, radially and especially circumferentially. The ability for expansion may be restricted due to the way the volume compensating compartment is arranged or mounted inside the connector part. However, the basic characteristics should not be restricted by this possible restricted arrangement. Moreover, due to the flexibility of the enclosure the whole volume compensating compartment is deformable.

Advantageously, the volume compensating compartment is constructed or embodied in such a way so that the enclosure comprises at least one double-walled section. Since both walls are flexible the inner volume may expand or be compressed at least towards the flexible walls of the double-walled section. Beneficially, the flexible walls of the double-walled section extend basically coaxially towards each other and in an assembled state in the connector part towards an axis of the connector part at least in an uncompressed state of the volume compensating compartment. Consequently, the inner volume can be compressed in radial direction away from the axis and towards the axis (when neglecting a possible restriction due to the positioning in the connector part).

Moreover, the enclosure or parts thereof, such as a double-walled section, may extend along a circumference of the volume compensating compartment to any degree feasible for a person skilled in the art. The chosen design depends for example on the mounting space of initials of the connector part or on the room needed during the mating of the connector part with another connector part or on a function of the selected part of the volume compensating compartment or on the overall size of the connector part/unit etc. Thus, axial segments of the volume compensating compartment may e.g. have an extension of 180°, 270° or even 360°.

Advantageously, the volume compensating compartment comprises several segments with different constructions providing the possibility to mediate different functions with the different segments. According to an embodiment the volume compensating compartment comprises at least one segment having a C-shaped cross section or kidney-shaped cross section. Since the enclosure in this segment does not extend around the whole circumference of the volume compensating compartment structures located in a space provided by the volume compensating compartment may be raised radially out of the provided space (details see below).

Hence, a connecting axis of contact elements can be arranged eccentrically in respect to a mating axis of the connector unit.

Advantageously, the volume compensating compartment comprises at least one segment having an annular cross section providing for example a positioning structure. Preferable, the volume compensating compartment is a bladder. Thus, a resilient structure can be provided.

A convenient and easily installable volume compensating compartment can be provided when it is embodied as a tubular-such as sleeve. The term "tubular-such as" is intended to mean that the overall shape is tubular, consequently, it is basically round and has a length being longer than a width of the sleeve.

The enclosure may be out of any material feasible form a person in the art, such as a flexible thermoplastic or an elastomer, such as rubber. The volume compensation or the expandability of the volume compensating compartment or its inner volume can be performed easily when the enclosure is embodied out of an elastomeric material. Especially good performances were found when the enclosure is embodied out of a silicone rubber.

Further, the connector part or the volume compensating arrangement, respectively, comprises the second volume compensating chamber to house a first medium and especially an incompressible compensation medium inside the connector part. The compensation medium surrounds initials of the connector part and e.g. protects these. The second volume compensating chamber may comprise one, two or several sub-sections, advantageously in flow communication with each other. Advantageously, the second volume compensating chamber is one cavity inside the connector part. To provide volume compensation for the second volume compensating chamber it is separated from the inner volume of the volume compensating compartment by a section of the enclosure. Advantageously, the section is a wall of the enclosure or its double-walled section, wherein that wall is arranged radially inwardly towards the axis of the connector part.

Thus, the second volume compensating chamber is for example encased partially or at one side by the separating section of the enclosure and partially or at the opposed side to the separating section by a part of the connector part and advantageously by an outer wall of the housing of the connector part.

Compared to the inner volume of the volume compensating compartment is an outer volume of the volume compensating compartment, which should be understood as a volume being at least partially enclosed by an outer surface of the enclosure or the separating section that separates the inner volume from the second volume compensating chamber. The outer volume is at least partially identical with or is a part of the second volume compensating chamber. Hence, the outer volume may be in contact with the initials, such as the compensation medium. There is no flow communication possible between the inner and the outer volume of the volume compensating compartment.

As stated above, the enclosure or its separating section partially encloses the second volume compensating chamber. The volume compensating compartment comprises a further section (opposed section) that is arranged radially opposed to the separating section. The separating section and the opposed section basically form the double-walled section. The volume compensating compartment is mounted or arranged inside the connector part in such a way so that an outer surface of the opposed section contacts the housing or is in contact with the surrounding environment, such as seawater. The opposed section is not in contact with the compensation medium.

The volume compensating compartment is fillable with a second medium surrounding the connector unit or at least the outer surface of the opposed section. The medium may be any medium feasible for a person skilled in the art, such as air, water or a medium (such as oil) not in flow communication with the first compensation medium. Advantageously, the volume compensating compartment is fillable with seawater or in the operable state of the connector part or unit the volume compensating compartment is filled with seawater. Hence, the second volume compensating chamber is pressure compensated against an ambient environment by the volume compensating compartment.

Moreover, the—separating—section of the enclosure of the volume compensating compartment comprises at least one profile changing element. Due to the varying of the profile of the volume compensating compartment, a maximum surface area of compensation can be realised whilst also allowing the mating function of the connector unit to operate. Hence, the selected characteristics of the volume compensating compartment are chosen to balance between sufficient compensation and an arrangement of initials of the connector part in the outer volume of the volume compensating compartment that ensures the proper mating function of the connector part.

A profile changing element is intended to mean a section where a continuous profile or contour, such as a circumferential extension, is altered. To provide functionality all along the volume compensating compartment the profile changing element extends at least partially in axial direction of the volume compensating compartment or the separating section and advantageously basically from a forward end to a rearward end of the volume compensating compartment or the separating section. Moreover, to provide a homogeneous expansion several profile changing elements are—evenly—distributed along an inner circumference of the volume compensating compartment. The profile changing element may have any shape or dimension feasible for a person skilled in the art, such as a dimple, a recess, a rip or advantageously a groove.

To allow an environmental medium (such as seawater) to enter the inner volume of the volume compensating compartment it comprises at least a first aperture. To prevent air or debris entrapment during e.g. the positioning or installation of the connector part subsea the volume compensating compartment comprises the first aperture and at least a second aperture.

Hence, the first aperture and the second aperture of the enclosure connects the inner volume of the volume compensating compartment with the environment so that the inner volume is fillable with the second medium or environmental fluid, especially seawater, from the environment via the first aperture and the second aperture.

The housing of the connector part comprises a first and advantageously a second channel to supply the inner volume with environmental fluid (such as seawater) via the first and second aperture or to connect the inner volume of the volume compensating compartment with an ambient environment. A direct feed can be provided when the first channel feeds the first aperture and the second channel feeds the second aperture with environmental medium.

The volume compensating compartment comprises a forward end and a rearward end, wherein in the mounted state in the connector part the forward end is positioned towards an insertion opening for the male part and the rearward end at the opposed end towards e.g. the connected cable. Furthermore, the first aperture is positioned at the forward end and the second aperture is positioned at the rearward end. Hence, environmental medium can travel the whole length of the volume compensating compartment.

As the volume of the compensation medium in the second volume compensating chamber changes e.g. through environmental influence (e.g. heat causing expansion) or during the mating of the connector parts, the elastomeric material of the enclosure deforms and pushes seawater out of the inner volume or pulls seawater back in through the apertures at the front and back of the connector part.

Hence, the connector part comprises the volume compensating arrangement with the third volume compensated chamber and the volume compensating compartment, wherein the third compensated chamber is filled with the first (incompressible, compensation medium) medium, in particular liquid or gel, and is sealed in respect to the environment and the volume compensating compartment comprises the enclosure that is flexible. The inner volume of the enclosure is filled with a second medium (such as seawater) that can flow into and out of the enclosure upon deformation of the enclosure such that a change in a volume of the first medium (e.g. due to temperature and/or pressure change) or a change of the third volume compensated chamber (e.g. due to a pin entering the bore) is at least partially compensated by a deformation of the enclosure and a displacement of the second medium.

Advantageously, the volume compensating compartment comprises a positioning structure holding the volume compensating compartment at a predefined position in the connector part. Hence, an accidental displacement of the volume compensating compartment can be avoided. The positioning structure may have any shape or may be any structure, such as a ring, a hook, a pin, a bolt, an aperture etc., or may be positioned at any region of the volume compensating compartment feasible for a person skilled in the art. Beneficially, the positioning structure is a ring arranged coaxially with the axis of the volume compensating compartment and in the mounted state inside the connector part coaxially with its axis. Due to this, a compact structure can be used. Advantageously, the positioning structure is arranged at the forward end of the volume compensating compartment. Convenient access to the inner volume can be provided when the positioning structure comprises the first aperture. The first aperture is advantageously arranged in a front face of the positioning structure arranging the first aperture basically coaxially with the axis of the volume compensating compartment.

Advantageously, the volume compensating compartment comprises a sealing flange or lip to seal the second volume compensating chamber of the connector part against the environment. Due to the integrally formed seal, an accidental displacement of the seal can be prevented. This seal prevents mixing of seawater and compensation medium or fluid of the connector part. The sealing flange may be located between components that compress the seal, forming an effective seal. Beneficially, the sealing flange is arranged at the rearward end of the volume compensating compartment. Convenient access to the inner volume can be provided when the sealing flange comprises the second aperture. The second aperture is advantageously arranged in a back face of the positioning structure arranging the second aperture basically coaxially with the axis of the volume compensating compartment. Moreover, since the first and second apertures are formed in the positioning structure or the sealing flange, respectively, they can be positioned in their correct location easily.

Further, the connector part comprises at least one shuttle pin arrangement. In an embodiment the volume compensating compartment forms at least one, especially cylindrical, space. The space may be formed by the separating section of the enclosure and the shuttle pin arrangement may occupy the outer volume. A compact and space-saving arrangement can be provided when the shuttle pin arrangement is at least partially arranged in the space of the volume compensating compartment in an assembled state of the connector part so that the enclosure at least partially surrounds the shuttle pin arrangement.

Advantageously, the space of the volume compensating compartment allows a passing of a shuttle pin of the shuttle pin arrangement. Hence, positioning space or room for the contact pin of the connector part entering the female part of the plug and thus the space of the volume compensating compartment during the mate can be advantageously provided. Consequently, the space of the volume compensating compartment also allows a passing of the contact pin of the connector part of the connector unit.

The connector part may be embodied as a female part of the connector unit. Due to this a reliable mating of the male and female part can be provided. Thus, one aspect of the invention refers to a male part and another aspect of the invention refers to a female part of a connector unit.

The invention further relates to a connector unit, specifically a subsea connector unit, e.g. embodied as a connector or penetrator, comprising at least a connector part according to the fifth aspect of the invention and at least a connector part according to the sixth aspect of the invention.

Due to the inventive matter, flexible volume compensation for both connector parts separately and for the connector unit as a whole can be provided. Consequently, a failure-proof and reliable connector unit can be provided. Moreover, a size of the connector unit can be reduced in comparison with state of the art systems resulting in a compact connector unit.

The above-described characteristics, features and advantages of this invention and the manner in which they are achieved are clear and clearly understood in connection with the following description of exemplary embodiments which are explained in connection with the drawings.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

FIG. 6 shows schematically a cross section through the second connector part of the subsea connector unit from FIG. 1 in an unmated position, FIG. 7 shows a perspective view of a volume compensating compartment of the connector part from FIG. 6, FIG. 8 shows schematically a side view of the volume compensating compartment from FIG. 7, FIG. 9: shows schematically a cross section through the volume compensating compartment from FIG. 8 along line IX-IX, FIG. 10: shows schematically a cross section through the volume compensating compartment from FIG. 8 along line X-X, FIG. 11: shows schematically a cross section through the volume compensating compartment from FIG. 8 along line XI-XI.

DETAILED DESCRIPTION OF INVENTION

Figure 1:
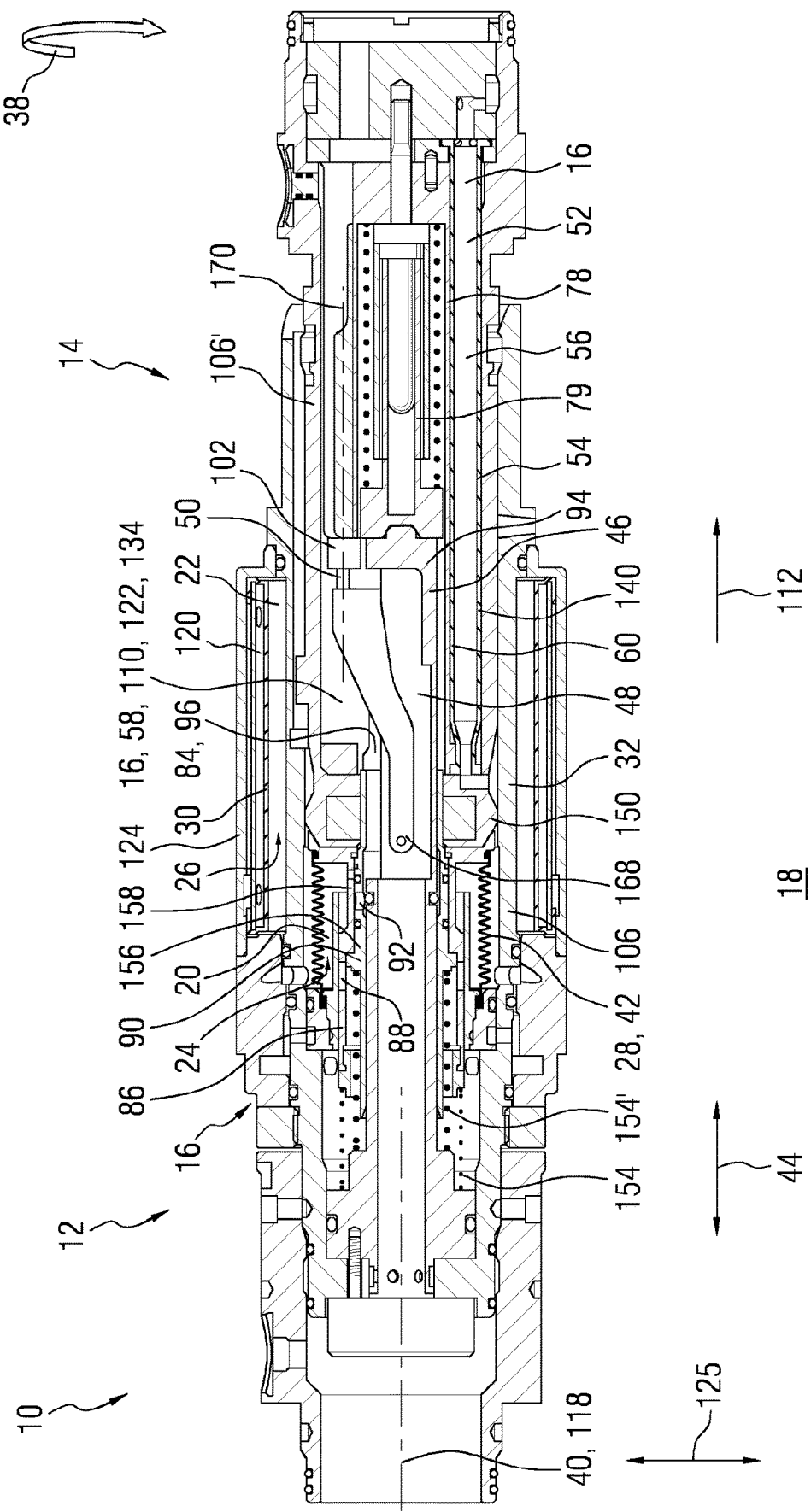
FIG. 1: shows schematically a cross section of a subsea connector unit with a male connector part and a female connector part in a mated state.

The illustrations in the drawings are schematically represented. It is noted that in different figures, similar or identical elements are provided with the same reference signs.

FIG. 1 shows an inventive wet mateable optical and/or high voltage subsea connector unit 10 in a mated state for connecting two connector parts, such as two subsea cables (not shown). In this example, the connector unit 10 comprises two connector parts 12, 14 in the form of a first female connector part 12 comprising a receptacle including a male pin, the end of which 166 is shown and a second plug, or a male part 14 having a shuttle pin (shown in FIG. 2) which receives and is pushed back by the end of the pin 166 during mating. The parts are embodied in such a way to establish a physical and specifically an optical connection after a mate of the parts 12, 14. The parts 12, 14 are shown in more detail in FIGS. 2 and 6 in their unmated states. The connector parts 12, 14 are intended for a use in a subsea application. The connector parts 12, 14 are each encased in a housing 106, 106' which will be axially aligned during a mating or de-mating process of the connector parts 12, 14.

The plug 14 is located at a plug front end 108 of e.g. a subsea cable and comprises an axially extending bore 110 to receive the male pin of connector part 12 during a mate of the connector parts 12, 14 in mating direction 112 that is coaxial to an axial direction 44. The bore 110 comprises seals 114 for preventing entering of water or dirt into internals of the connector part 14.

The male pin 166 of connector part 12 is located at a receptacle front end 116 of e.g. the other subsea cable and comprises a displaceable element 46 embodied as a contact or male pin 46 or a receptacle pin assembly that extends along a mating axis 118 of the connector unit 10. For a mating of the connector parts 12, 14 the bore 110 and the receptacle pin 46 will be arranged vertically aligned towards each other, so that by moving the receptacle pin 46 in direction of the female part of plug 14 or the mating direction 112, the receptacle pin 46 can partially enter the bore 110 of the female part of connector part 14. Due to a proper positioning of the receptacle pin 46 in the bore 110 of the connector part 14 an optical and/or electrical connection is established (details see below).

The features of the connector part 12 will now be described with reference to FIGS. 2 to 5. To isolate internals of the part 12, such as the receptacle pin 46 and associated structures from the surrounding seawater, that can enter a first and a second cavity 120, 120' of the connector part 12, and to compensate external factors the connector part 12 comprises a volume compensating arrangement 16 that is filled with a compensation medium 122 or lubricant (such as isolating oil). The volume compensating arrangement 16 compensates pressure as well as thermal expansion and contraction of the compensation medium 122 and is pressure compensated against an ambient environment 18 in the submerged state subsea.

Figure 16:
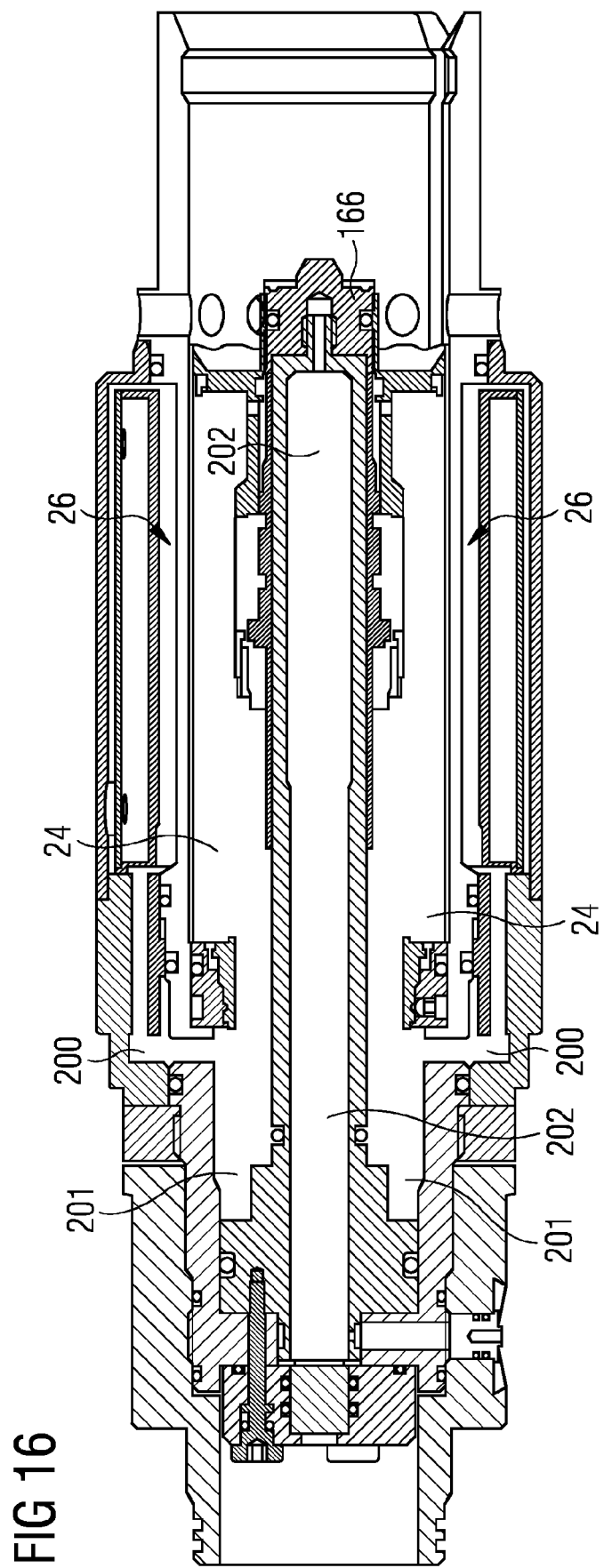
FIG. 16: illustrates volume compensation in one connector part, when unmated; and, FIG. 17: illustrates volume compensation in the connector part of FIG. 16, when mated.
Figure 17:
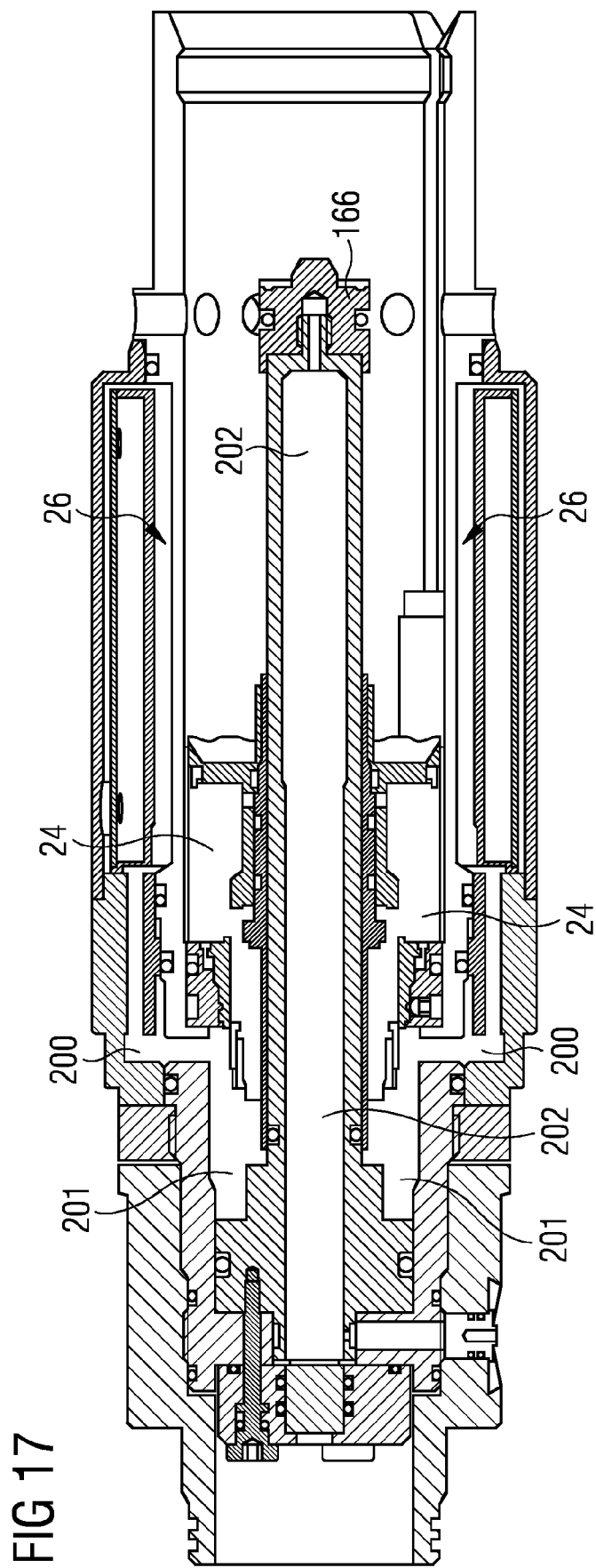

More detail of the flow channels is illustrated in FIGS. 16 and 17. The volume compensating arrangement 16 comprises a first volume compensating chamber 20 encasing a first volume 24 and a third volume compensating chamber 22 encasing a second volume 26. The first and third volume compensating chambers 20, 22 are in flow communication with each other through a channel 200, 201. Moreover, the first volume compensating chamber 20 comprises a first flexible wall 28 and the third volume compensating chamber 22 comprises a second flexible wall 30, wherein the first flexible wall 28 at least partially encases the first volume 24 and the second flexible wall 30 at least partially encases the second volume 26. Furthermore, the first volume 24 is variable by deforming the first flexible wall 28 and the second volume 26 is variable by deforming the second flexible wall 30.

Both the first and second flexible walls 28, 30 comprise an elastomeric material and specifically, silicone rubber.

The first flexible wall 28 of the first volume compensating chamber 20 is embodied as a concertina-like bellows 42 extending in axial direction 44 of the connector part 12. In an unmated state of the connector unit 10 the first volume compensating chamber 20 is arranged in circumferential direction 38 around the contact pin 46. A volume compensation of the first volume compensating chamber 20 is performable by folding or unfolding the concertina-like bellows 42 (details see below). In the unmated state, as illustrated by FIG. 16, there is flow communication between the volumes 24 and 26 via passages 200, 201. There is also flow communication between the volumes 24, 26 and volume 202 of a communication chamber 48. When in the mated state, the concertina-like bellows are compressed and the volume 24 is reduced. The compression brings moveable elements 86, 90, as described in more detail below, into position to interrupt flow communication between the communication chamber 48 and the volume compensating chamber 20. Whilst volumes 24, 26 remain in fluid communication through passages 200, 201, volume 202 of the communication chamber is sealed off and then brought into flow communication with a second volume compensating chamber 58 of the second connector part 14.

The third volume compensating chamber 22 further comprises a rigid wall 32 that also at least partially encases the second volume 26. The rigid wall 32 is part of the housing 106 surrounding the internals of the connector part 12. Hence, the connector pin 46 with the surrounding first volume compensating chamber 20 is positioned inside the housing 106. Further, the rigid wall 32 radially restricts the second cavity 120' and thus separates the third volume compensating chamber 22 from seawater cavity 120'. Furthermore, the second flexible wall 30 is arranged radially opposed to the rigid wall 32 and extends in circumferential direction 38 around the rigid wall 32. Consequently, the second flexible wall 30 also surrounds the first flexible wall 28 radially outwardly and in circumferential direction 38. Moreover, the second flexible wall 30 is covered by a cover 124 covering the first seawater cavity 120 and thus protecting the second flexible wall 30 by preventing direct access for any sharp implements that could rupture or otherwise damage the second flexible wall 30 or the diaphragm. The second flexible wall 30 may be supported by a thin metal sheet for stability, wherein the metal sheet is arranged in cavity 120 and comprises openings to allow seawater to exit or enter cavity 120 (not specifically marked with reference numerals).

The second flexible wall 30 is embodied as a radially expandable membrane or diaphragm. During the mating of the connector parts 12, 14 (details see below) a volume compensation of the third volume compensating chamber 22 is performable by changing a radial distance 34, 36 (a distance 36, 38 in radial direction 125) between the second flexible wall 30 and the rigid wall 32. This may be achieved by stretching or shrinking of the elastic material of the flexible wall 30 balloon-like (not shown in detail).

Figure 3:
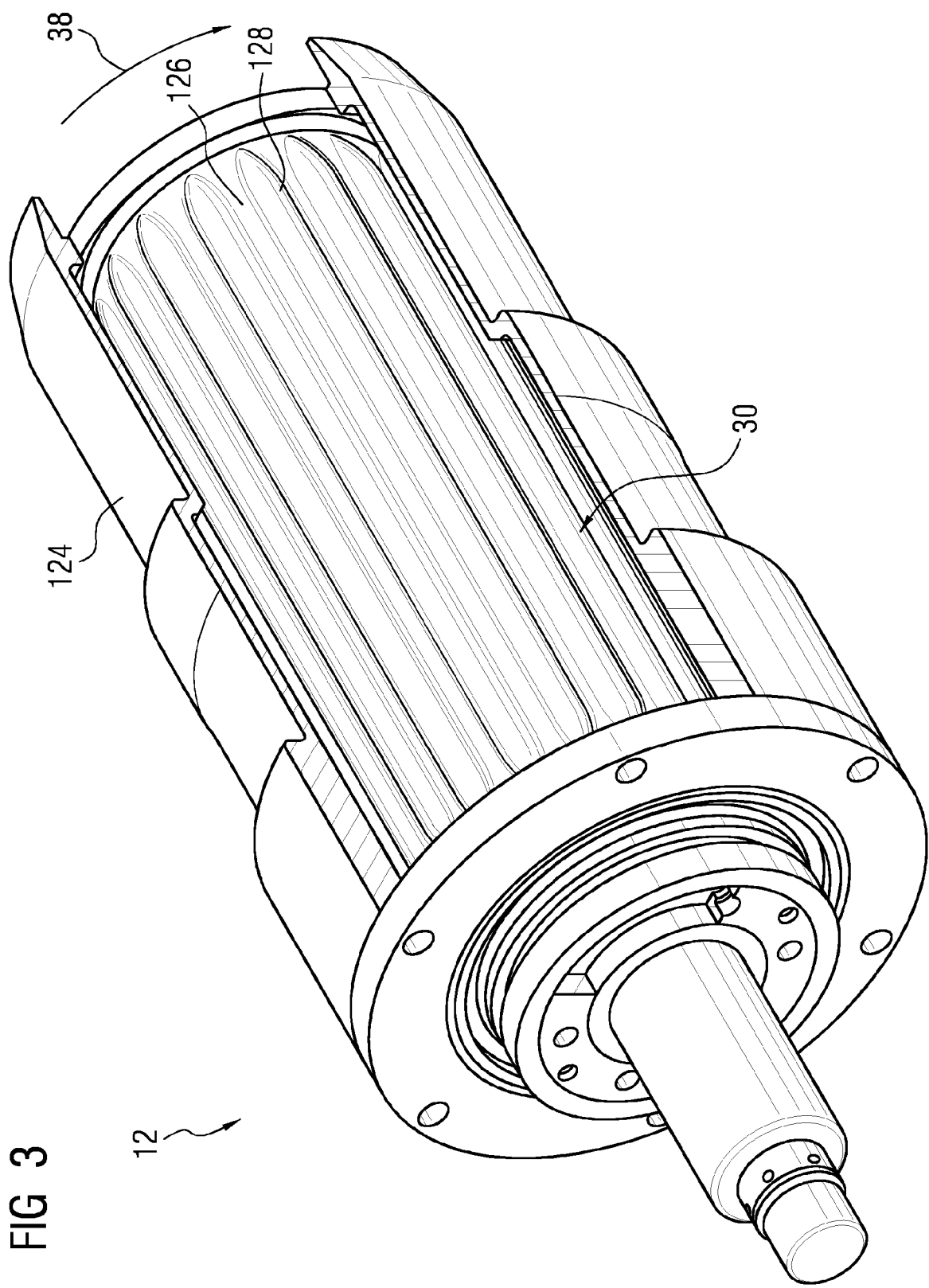
FIG. 3: shows a perspective view of flexible wall of a third compensating chamber of the connector part from FIG. 2 in an unexpanded state.
Figure 4:
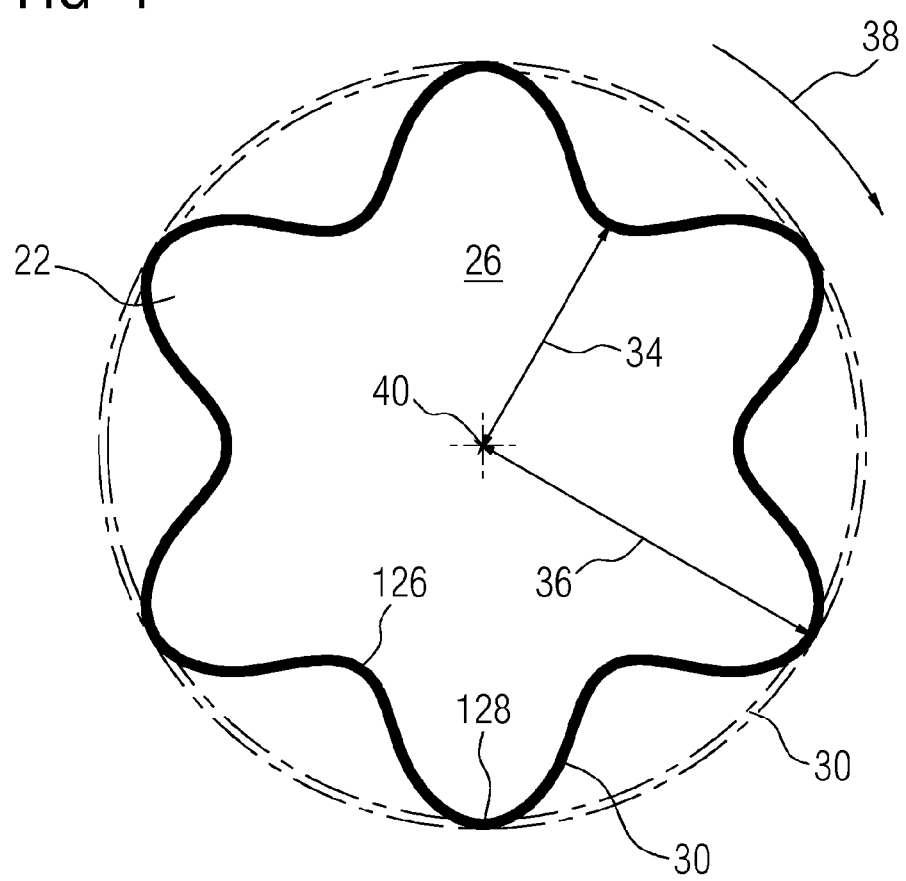
FIG. 4: shows schematically a cross section through the flexible wall of FIG. 1 along line IV-IV.
Figure 5:
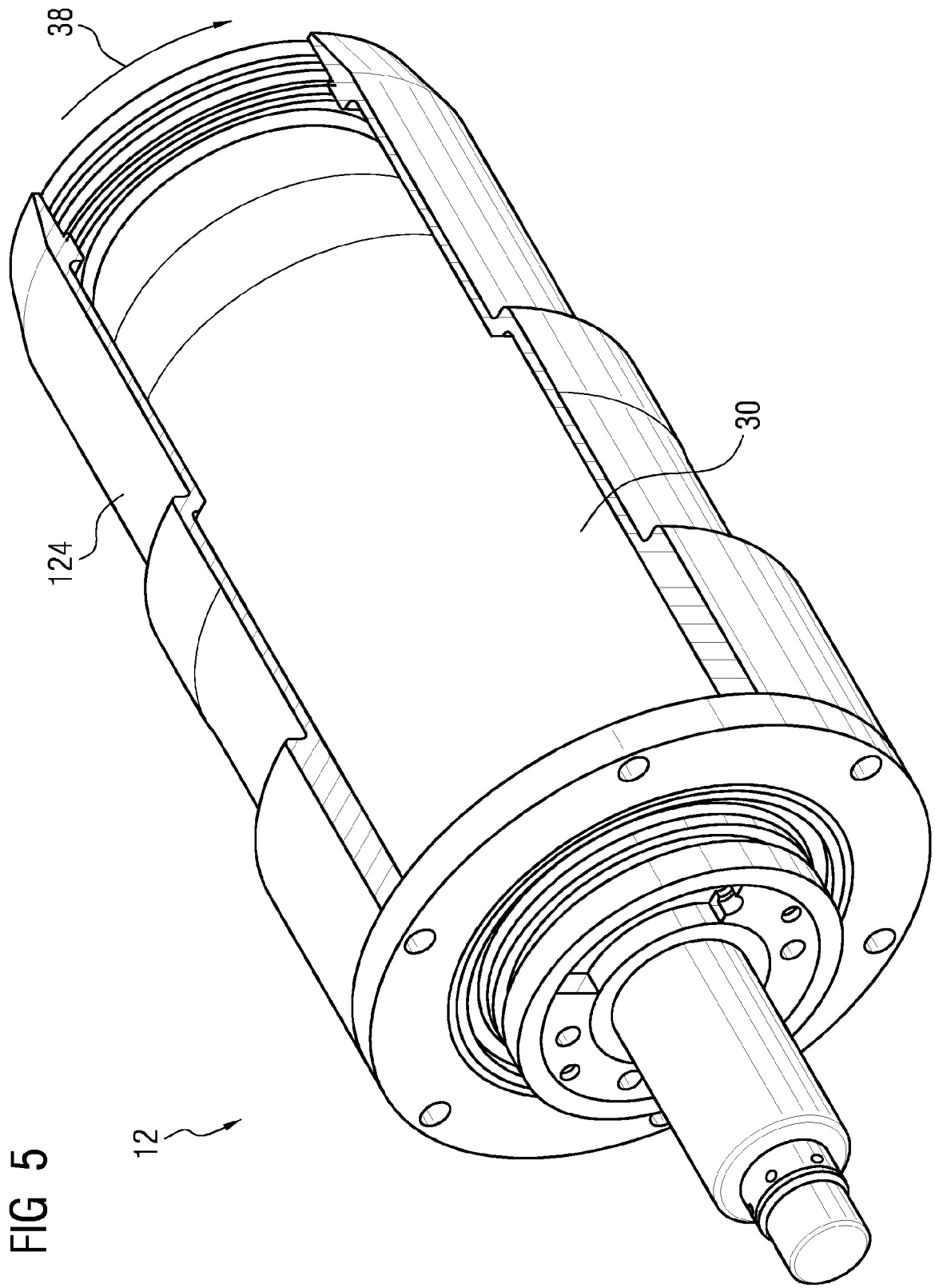
FIG. 5: shows the flexible wall from FIG. 3 in an expanded state.

Advantageously, the second flexible wall 30 has in circumferential direction 38 the contour of a circular standing wave and thus comprises radial minima 126 and maxima 128 so that the second flexible wall 30 has different radial distances 34, 36 in circumferential direction 38 of the second flexible wall 30 in reference to an axis 40 of the connector part 12. This is depicted in FIGS. 3 and 4 (FIGS. 3 and 5 show an alternatively embodied cover). Due to the volume compensation of the first and third volume compensating chambers 20, 22 the radial distances 34, 36 or the minima 126 and maxima 128 are deformed or smoothed (details see below). This is depicted in FIGS. 4 and 5, wherein the dashed contour in FIG. 4 shows the second flexible wall 30 in its fully expanded state.

The features of the connector part 14 will now be described with reference to FIGS. 6 to 12. The connector unit 10 or the connector part 14, respectively, further comprises a shuttle pin arrangement 78 with a shuttle pin 79 to support the connection between the connector parts 12, 14. Moreover, the shuttle pin arrangement 78 is designed to keep water out of the connector part 14 of the subsea connector unit 10. The shuttle pin arrangement 78 is inserted into a front end of the bore 110 of the plug front end 108. In the unmated position a front face 130 of the shuttle pin arrangement 78 is flush with a contact face 132 of the connector part 14 or its front seal 114, respectively. During the mate and in the mated state the bore 110 forms a receiving chamber 134 for the receptacle pin 46 of the connector part 12.

To isolate the internals of the connector part 14 from the surrounding seawater and to prevent seawater and debris to enter the receiving chamber 134 the receiving chamber 134 is filled with compensation medium 122. To compensate thermal expansion and contraction of the compensation medium 122 as well as pressure compensate the receiving chamber 134 against the ambient environment 18 the connector part 14 comprising a volume compensating arrangement 16. Hence, the medium filled receiving chamber 134 builds also a second volume compensating chamber 58 of the connector part 14 or its volume compensating arrangement 16.

To pressure compensate the second volume compensating chamber 58 against the environment 18 or the seawater surrounding the connector unit 10 the volume compensating arrangement 16 further comprises a volume compensating compartment 52 that comprises an enclosure 54 encasing an inner volume 56 of the volume compensating compartment 52. To provide volume compensation of the second volume compensating chamber 58 the enclosure 54 is embodied flexible. Thus, the enclosure is fabricated out of an elastomeric material and especially silicone rubber.

An exemplary embodiment of the volume compensating compartment 52 is shown in FIGS. 7 to 11. As could be seen in FIG. 7 the volume compensating compartment 52 is a bladder and is embodied as a tubular-like sleeve 64 having in axial direction 44 several segments, namely a positioning structure 74 having an annular cross section, a half-shell segment 136, a circumferentially enlarged segment 138 and a sealing flange 76. The half-shell segment 136 and the circumferentially enlarged segment 138 have a C-shaped or kidney-shaped cross section. Hence, in these regions the enclosure 54 of the volume compensating compartment 52 does not extend over the whole circumference of the volume compensating compartment 52. In other words, the enclosure 54 has an opening 139 in its circumference.

The half-shell segment 136 and the circumferentially enlarged segment 138 both form a double-walled structure with a radially inner wall section 60 and a radially opposed outer wall section 140 to the inner wall section 60. To ensure a sufficient deformability of the volume compensating compartment 52 the section 60 of the enclosure 54 comprises several and in this exemplary embodiment four profile changing elements 62. The profile changing elements 62 are evenly distributes along a circumferential surface of the section 60 and are embodied as grooves 142 extending in axial direction 44 either along the half-shell segment 136 and the enlarged segment 138 or only along the enlarged segment 138 (see FIGS. 8 to 11). The profile changing elements 62 provide a maximum surface area of compensation.

When the volume compensating compartment 52 is assembled or mounted in the connector part 16 (see FIG. 6) the second volume compensating chamber 58 or the compensation medium 122 inside the second volume compensating chamber 58, respectively, is separated from the inner volume 56 of the volume compensating compartment 52 by the inner wall or separating section 60 of the enclosure 54. The opposed wall section 140 is positioned at and contacts an outer wall of the housing 106' of the connector part 14.

The positioning structure 74 is embodied as a ring and is arranged at a forward end 70 of the volume compensating compartment 52, which is arranged near the seals 114 of the bore 110. The positioning structure 74 holds the volume compensating compartment 52 at a predefined position in the connector part 14. Moreover, the sealing flange 76 is arranged at the rearward end 72 of the volume compensating compartment 52, which is arranged near an attachment side for the cable. The sealing flange 76 seals the second volume compensating chamber 58 against the seawater.

The volume compensating compartment 52 comprises a first aperture 66 and a second aperture 68 that connect the inner volume 56 with the environment 18 so that the inner volume 56 is fillable with environmental fluid, especially seawater, from the environment 18 via the first aperture 66 and the second aperture 68. The axially extending first aperture 66 is positioned at the forward end 70 of the volume compensating compartment 52 in a front face 144 of the positioning structure 74. Further, the axially extending second aperture 68 is positioned at the rearward end 72 of the volume compensating compartment 52 in a back face 146 of the sealing flange 76. To allow the seawater to enter the connector part 14 and specifically the volume compensating compartment 52 the housing 106' comprises channels 148 leading towards the apertures 66, 68 of the volume compensating compartment 52.

Figure 12:
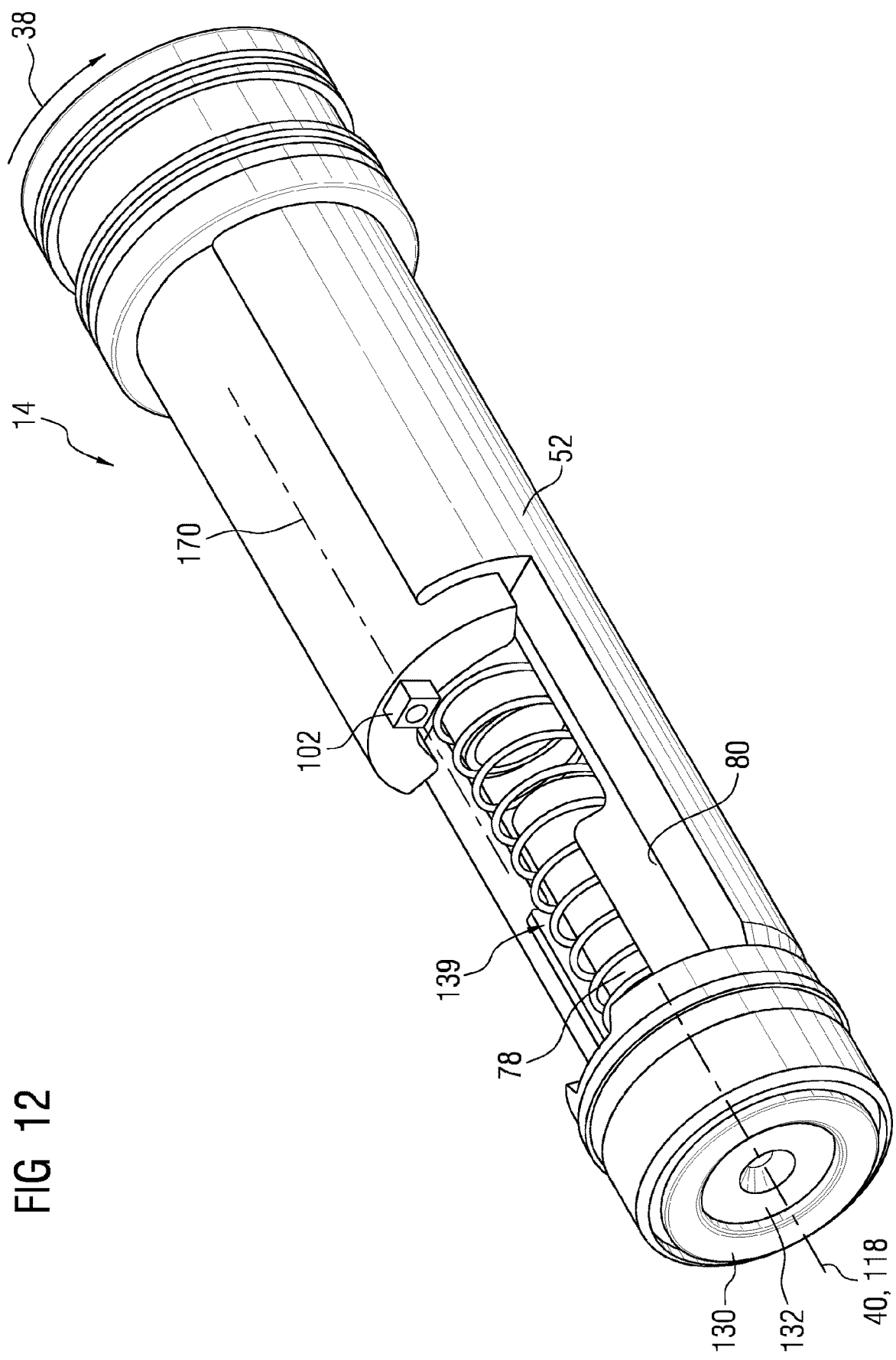
FIG. 12: shows a perspective view of the connector part from FIG. 6 in the unmated state.

The separating section 60 of the enclosure 54 surrounds an outer volume of the volume compensating compartment 52 that forms a cylindrical space 80 for the shuttle pin arrangement 78 so that the shuttle pin arrangement 78 is arranged in the space 80. A not specifically labelled wall of the shuttle pin arrangement 78 may contact the separating section 60 of the volume compensating compartment 52. This is shown in FIG. 12.

Figure 2:
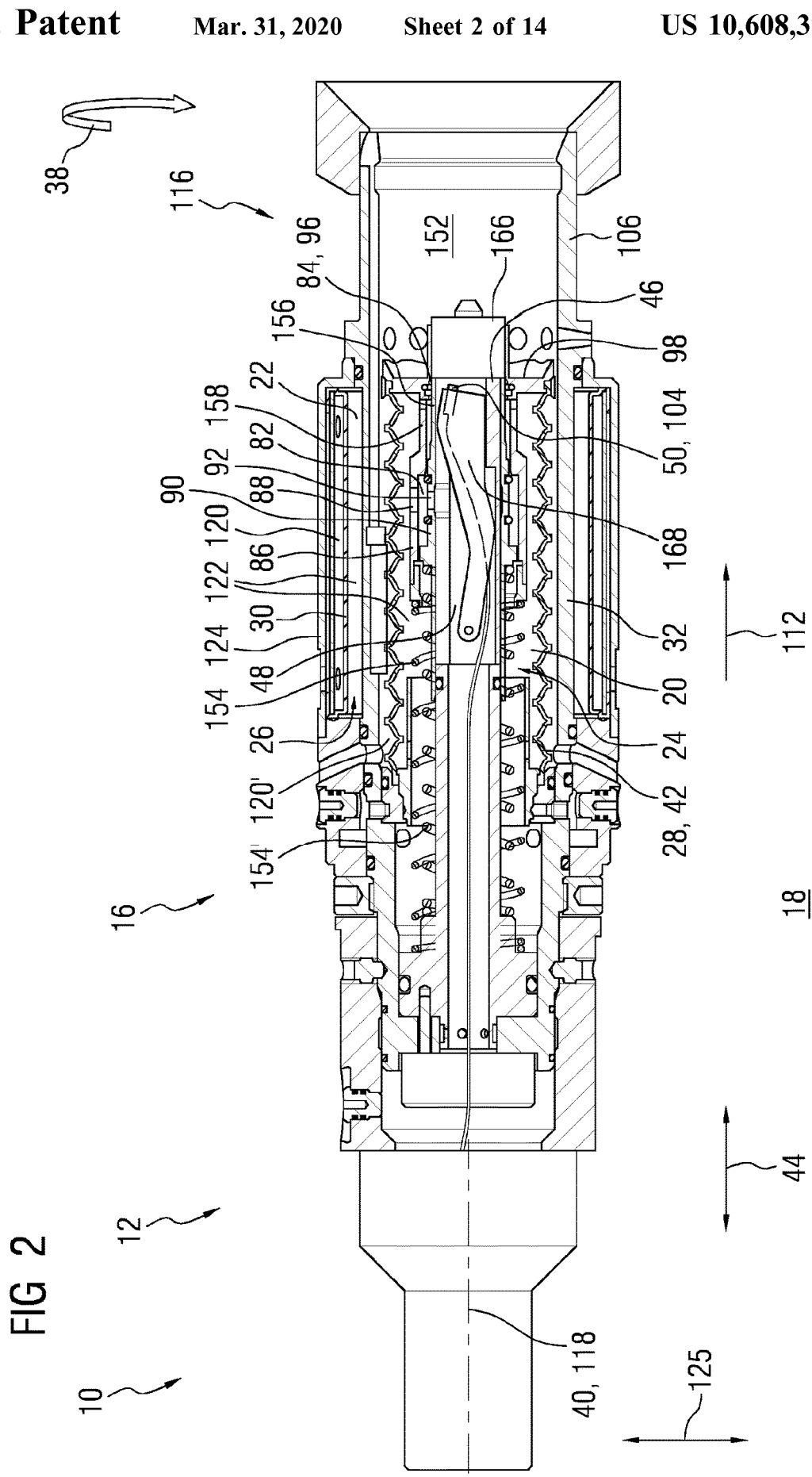
FIG. 2: shows schematically a cross section through the first connector part of the subsea connector unit from FIG. 1 in an unmated position.

As stated above and as can be seen in FIG. 2 the male contact pin 46 is a contact support element 46 that at least partly enters the second connector part 14 of the connector unit to eventually establish the connection between the connector parts 12, 14. Hence, the contact support element 46 or the contact pin 46 comprises a communication chamber 48 in which a first contact element 50 of the connector part 12 is disposed. The first contact element 50 comprises a least an optical contact 104. In the unmated state the communication chamber 48 is in flow communication with the first volume compensating chamber 20. The flow communication is provided by a first passageway 82 connecting the first volume compensating chamber 20 and the communication chamber 48. Moreover, the first passageway 82 is formed basically by a first opening 88 and a second opening 92 that are axially aligned in the unmated state of the connector unit 10.

During the mating of the connector parts 12, 14 walls 150 of the female housing 106' enter a receptacle 152 of the connector part 12 till the contact face 132 of the connector part 14 contacts a contact face 98 of the connector part 12. By pushing the connector part 14 further into the receptacle 152 of the connector part 12 the contact face 98 is pushed back against the mating direction 112. Since, the first flexible wall 28 or the concertina-like bellows 42 of the first volume compensating chamber 20 is attached to the contact face 98 it is also pushed back. Due to the concertina-like embodiment the first flexible wall 28 is folded to its most compressed or folded configuration in the mated state. Moreover, the first volume 24 of the first volume compensating chamber 20 is reduced and the compensation medium 122 within is pushed through the channel to the third volume compensating chamber 22 increasing its second volume 26. Further seawater is pushed from the second cavity 120'.

Since the third volume compensating chamber 22 comprises the second flexible wall 30 with the minima 126 and maxima 128 it can radially expand and provide volume compensation for the first volume compensating chamber 20 and further press seawater out of the first cavity 120.

To prevent depletion of compensation medium for both connector parts 12, 14 the connector unit 10 is configured such that during mating of the connector parts 12, 14, the communication chamber 48 is separated from the first volume compensating chamber 20 and is brought into flow communication with the second volume compensating chamber 58, so that the communication chamber 48 is pressure compensated via the second volume compensating chamber 58 in the mated state of the connector unit 10.

This actuation sequence is triggered by the mate and acts on a first moveable element 86 and a second moveable element 90 of the connector part 12 as well as on the first passage way 82 and a second passageway 84 connecting the second volume compensating chamber 58 and the communication chamber 48 in the mated state of the connector unit 10. This second passageway 84 is embodied as an aperture 96 in an outer wall 94 of the communication chamber 48.

Both moveable elements 86, 90 are embodied as sleeves 100 that are arranged around or that surround the contact support element 46 or the receptacle pin 46, respectively. Moreover, the moveable elements 86, 90 extend coaxially to one another and towards the axis 40 of the connector part 12. Furthermore, the second moveable element 90 or inner sleeve 100 is arranged radially inside the first moveable element 86 or outer sleeve 100. Both moveable elements 86, 90 are biased in there forward position by different springs 154, 154'. The spring 154' that activates the second moveable element 90 or the inner sleeve 100 has a higher spring rate (i.e. exerts more resistance to being compressed) than the spring 154 that activates the first moveable element 86 or the outer sleeve 100.

As stated above the first moveable element 86 comprises the first opening 88 and the second moveable element 90 the second opening 92. In the unmated state of the connector unit 10 the moveable elements 86, 90 are arranged in respect to one another and to the communication chamber 48 or its aperture 96, respectively, so that the openings 88, 92 form the first passageway 82 and that an end section 156 of the second moveable element 90 covers the aperture 96 and thus the second passageway 84. Hence, in the unmated state of the connector unit 10 the second moveable element 90 closes the second passageway 84.

The first moveably element 86 is formed integrally with the contact face 98 of the connector part 12. Hence, when the contact face 98 is pushed back during the mate of the connector parts 12, 14 the first moveably element 86 slides back and compresses the respective spring 154. An end section 158 of the first moveable element 86 is positioned radially over the second opening 92 of the second moveable element 90. Thus, the second opening 92 is closed by a movement of the first moveable element 86 during the mate of the connector unit 10. To securely seal the communication chamber 48 from the first volume compensating chamber 20 the second opening 92 is flanked by two seals 160, embodied as O-rings. The resulting arrangement of parts is shown in FIG. 13.

Hence, a flow communication between the communication chamber 48 and the first volume compensating chamber 20 is interrupted or in other words the communication chamber 48 is separated from the first volume compensating chamber 20 by closing the first passageway 82 during the mating of the first and second connector parts 12, 14. Thus, the first moveable element 86 is arranged at a first position in the unmated state of the connector unit 10 and is moved to a second position during the mating of the first and second connector parts 12, 14, wherein in the second position, the first moveable element 86 seals the first passageway 82 to provide said separation between the first volume compensating chamber 20 and the communication chamber 48 in the mated state of the connector unit 10.

Figure 13:
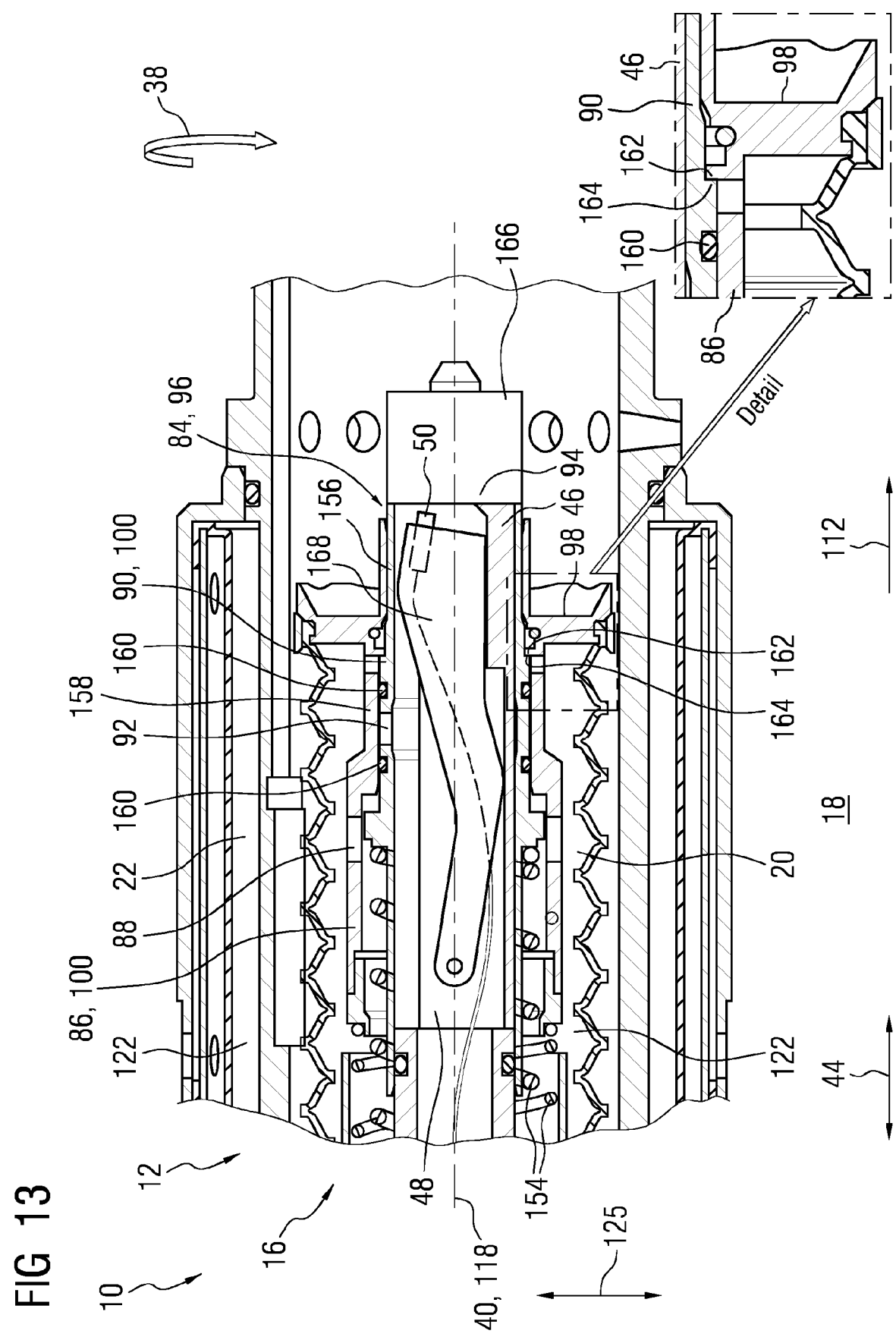
FIG. 13: shows schematically a cross section of the connector part from FIG. 2 during a mate with the part from FIG. 6 showing a communication chamber of the connector part in a closed-off state.
Figure 14:
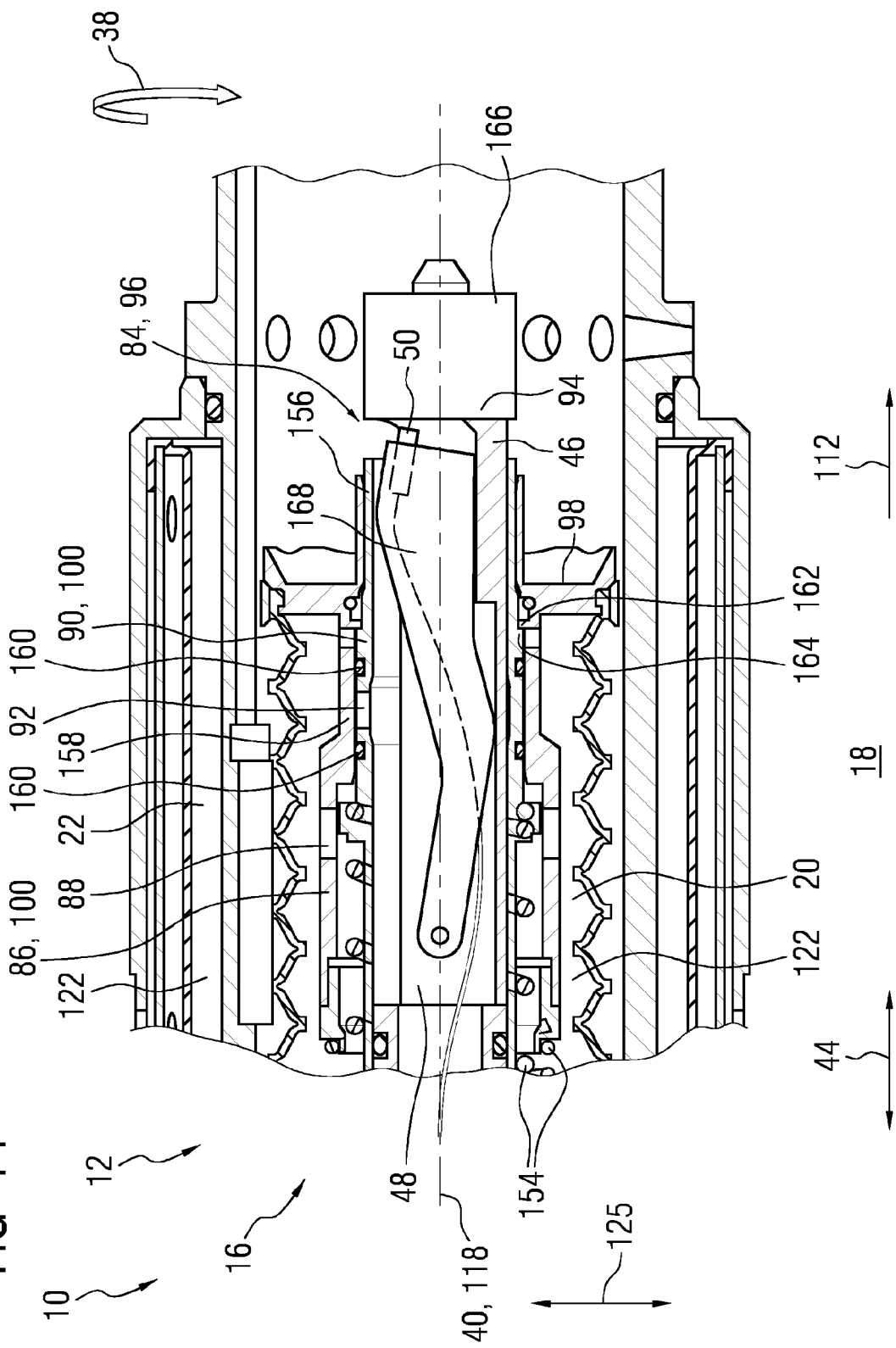
FIG. 14: shows schematically a cross section of the connector part from FIG. 2 during the mate with the connector part from FIG. 6 showing the communication chamber from FIG. 13 in a partially opened state.

By moving the first moveable element 86 further back an abutment surface 162 of the first moveable element 86 abuts against a corresponding abutment surface 164 of the second moveable element 90 (see the enlarged detailed presentation in FIG. 13). Hence, during the subsequent mating movement both moveable elements 86, 90 are pushed back compressing the respective spring 154, 154'. Due to this the end section 156 of the second moveable element 90 uncovers the aperture 96 so that the second passage way 84 and consequently the communication chamber 48 is opened. Hence, the second passageway 84 is opened by a movement of the second moveable element 90 during the mating of the first and second connector parts 12, 14 and the communication chamber 48 is brought into flow communication with the second volume compensating chamber 58 by opening the second passageway 84 during the mating of the first and second connector parts 12, 14. The beginning of the opening of the communication chamber 48 is shown in FIG. 14.

In summery the connector unit 10 operates according to a method, that comprises at least the steps of: Moving the first moveable element 86 and thus closing the first passageway 82 between the first volume compensating chamber 20 and the communication chamber 48 preventing flow communication between the first volume compensating chamber 20 and the communication chamber 48 and subsequently, moving the second moveable element 90 and thus opening the second passageway 84 between the second volume compensating chamber 58 and the communication chamber 48 allowing flow communication between the second volume compensating chamber 58 and the communication chamber 48 so that the communication chamber 48 is pressure compensated via the second volume compensating chamber 58 in the mated state of the connector unit 10.

Simultaneously to the contacting of the contact faces 98, 132 of the connector parts 12, 14 a front face 166 of the receptacle pin 46 contacts the front face 130 of the shuttle pin assembly 78. Hence, during the mate the shuttle pin assembly 78 is pushed back by the receptacle pin 46 in mating direction 112 and shortens in a telescope-like fashion to provide space for the receptacle pin 46. Thus, the space 80 of the volume compensating compartment 52 allows a passing of the shuttle pin 79 and a passing of the contact pin 46. Due to a pushing force of the receptacle pin 46 during the mate the compensation medium 122 inside the second volume compensating chamber 58 is displaced in the receiving chamber 134. This is done by expanding the flexible enclosure 54 or its separating section 60 radially outwardly and by pushing seawater out of the inner volume 56 of the volume compensating compartment 52 through the apertures 66, 68 into the environment 18. In the mated state communication via the channel 148 and aperture 66 is basically blocked by the engagement of rigid wall 32 with wall 150 of the connector part 14.

Figure 15:
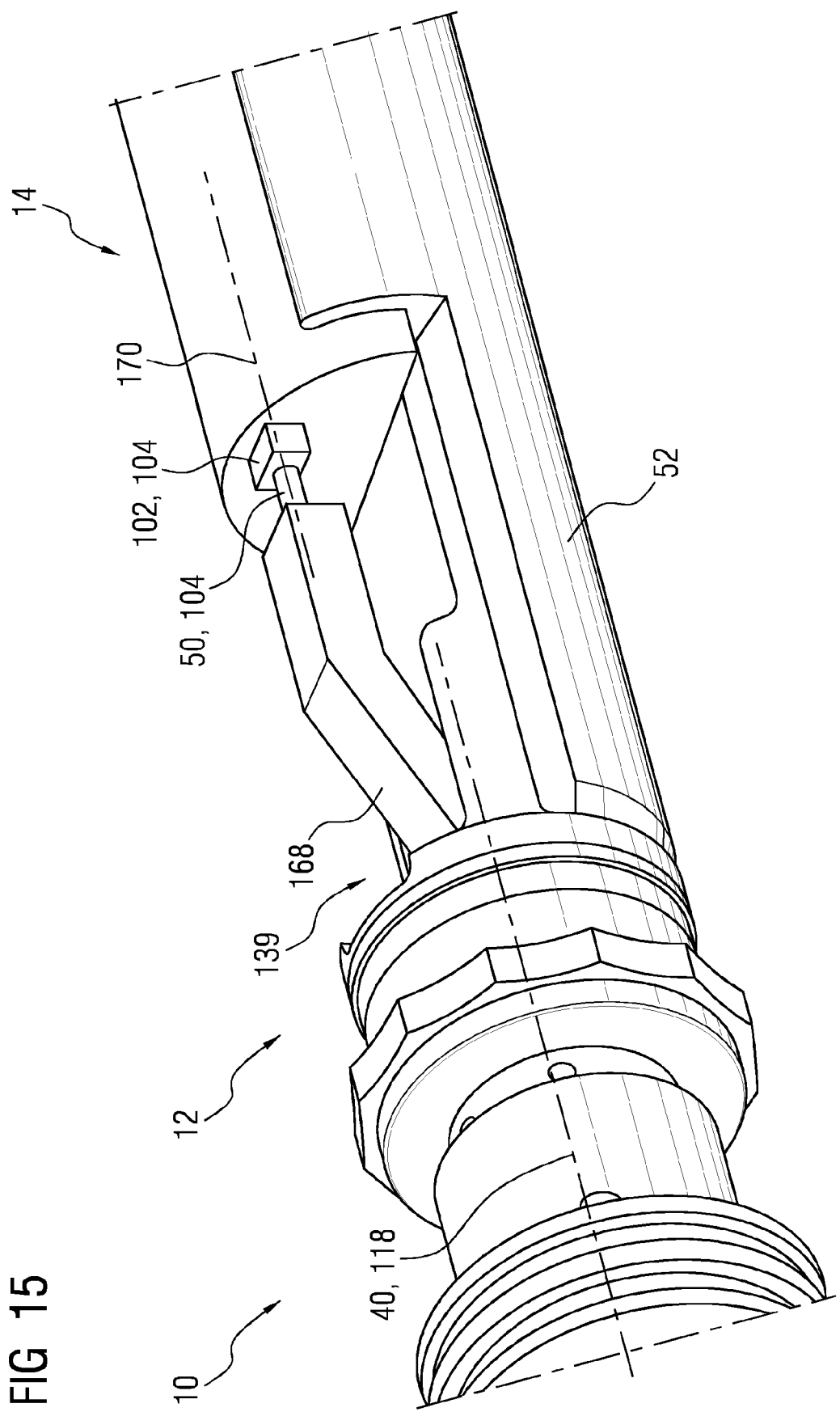
FIG. 15: shows a perspective view of the connector part from FIGS. 6 and 12 in the mated state.

During the mate a connecting structure 168, for example embodied as an arm, is raised out of the opened communication chamber 48. The embodiment and operating mechanism of the connecting structure 168 may be, for example, implemented as disclosed in U.S. Pat. No. 6,929,404 B2 or in European patent application EP 16156898.5. Due to the opening 139 in the enclosure the connecting structure 168 can be raised out of space 80 or the outer volume of the volume compensating compartment 52 as well. The contact element 50 can be brought into contact with a second contact element 102 of the connector part 14 that is disposed in the second volume compensating chamber 58 and also comprises a least an optical contact 104. The embodiment of the second contact element 102 and the mechanism for connecting the first and second contact elements 50, 102 may be, for example, embodied as disclosed in European patent application EP 15194712.4. Due to the selected construction of the volume compensation compartment 52 and especially due to its half-shell segment 136, that does not extend over a whole circumference of the volume compensating compartment 52, and the opening 139a connecting axis 170 of the contact elements 50, 102 can be arranged eccentrically in respect to the mating axis 118 of the connector unit 10. This is shown in FIG. 15.

The de-mate sequence operates basically in the vice versa sequence to the mating sequence. The different spring forces of the springs 154, 154' control the activation or motion of the moveable elements 86, 90 and thus the closing of the second passage way 84 beforehand of the opening of the first passageway 82.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

Although the invention is illustrated and described in detail by the embodiments, the invention is not limited by the examples disclosed, and other variations can be derived therefrom by a person skilled in the art without departing from the scope of the invention.

The invention claimed is:

1. A connector unit comprising:
a first connector part and a second connector part; wherein the first connector part comprises at least a first volume compensating chamber that is pressure compensated against an ambient environment, and comprises a contact support element that at least partly enters the second connector part of the connector unit during mating of the connector unit; wherein the second connector part of the connector unit comprises at least a second volume compensating chamber that is pressure compensated against the ambient environment; and
a communication chamber configured to be in flow communication with the first volume compensating chamber via a first outlet to a first passageway in an unmated state, wherein the first outlet is closed in a mated state, the communication chamber further configured to be in flow communication with the second volume compensating chamber via an aperture to a second passageway in the mated state, wherein the aperture is closed in the unmated state;
wherein the connector unit is configured such that during mating of the first connector part and the second connector part, flow communication between the communication chamber and the first volume compensating chamber of the first connector part is interrupted and the communication chamber is separated from the first volume compensating chamber by closing the first passageway and the communication chamber is brought into flow communication with the second volume compensating chamber of the second connector part by uncovering the aperture so that the second passageway and consequently the communication chamber is opened, so that the communication chamber is pressure compensated via the second volume compensating chamber in the mated state of the connector unit.

2. The connector unit according to claim 1, wherein the flow communication between the communication chamber and the first volume compensating chamber is interrupted by closing the first passageway connecting the first volume compensating chamber and the communication chamber during the mating of the first connector part and the second connector part.

3. The connector unit according to claim 1, wherein the communication chamber is brought into flow communication with the second volume compensating chamber by opening the second passageway connecting the communication chamber and the second volume compensating chamber during the mating of the first connector part and the second connector part.

4. The connector unit according to claim 2, further comprising:
at least first moveable element that is arranged at a first position in the unmated state of the connector unit and is moved to a second position during the mating of the first connector part and the second connector part, wherein in the second position, the first moveable element seals the first passageway connecting the first volume compensating chamber and the communication chamber to provide said separation between the first volume compensating chamber and the communication chamber in the mated state of the connector unit.

5. The connector unit according to according to claim 1, further comprising a first moveable element comprising a first opening and a second moveable element comprising at least a second opening, wherein the first passageway is formed by the first opening and the second opening in the unmated state of the connector unit and wherein the second opening of the second moveable element is closed by a movement of the first moveable element during a mating of the connector unit.

6. The connector unit according to claim 1, further comprising a second moveable element, wherein the second moveable element closes the aperture in the unmated state of the connector unit and wherein the second passageway is opened by a movement of the second moveable element during the mating of the first connector part and the second connector part.

7. The connector unit according to claim 1, wherein the communication chamber comprises at least one outer wall and wherein the aperture is embodied as an aperture in the at least one outer wall.

8. The connector unit according to claim 1, wherein the first connector part comprises at least one contact face that contacts the second connector part during the mating of the first connector part and the second connector part and/or the first connector part further comprises at least a first moveable element and/or wherein the first moveable element is formed integrally with the at least one contact face and/or wherein the first moveable element is embodied as a sleeve at least partially surrounding the contact support element.

9. The connector unit according to claim 1, wherein the contact support element comprises a pin of the first connector part, and
wherein the communication chamber is arranged inside the pin, and
wherein the first connector part comprises an at least first moveable element embodied as a sleeve that is moveable on the pin to seal the first passageway that provides the flow communication between the communication chamber and the first volume compensating chamber during a mating of the connector unit and
wherein the first connector part comprises an at least second moveable element embodied as a sleeve that is moveable on the pin to open the aperture that is disposed in the pin and that provides the flow communication between the communication chamber and the second volume compensating chamber during the mating of the connector unit.

10. The connector unit according to claim 1, further comprising:
a first contact element and a second contact element and wherein the first contact element is disposed in the communication chamber of the contact support element and/or wherein the second contact element is disposed in the second volume compensating chamber of the second connector part.

11. The connector unit according to claim 10, wherein the first contact element and/or the second contact element comprises a least an optical contact.

12. The connector unit according to claim 1, wherein the first connector part comprises a male part and/or wherein the second connector part comprises a female part.

13. A method for operating a connector unit, comprising a first connector part comprising a first volume compensating chamber and a communication chamber, and a second connector part comprising a second volume compensating chamber, wherein the method comprises:
closing a first passageway between the first volume compensating chamber and the communication chamber, thus preventing a flow communication between the first volume compensating chamber and the communication chamber and subsequently,
opening a second passageway between the second volume compensating chamber and the communication chamber, thus allowing a flow communication between the second volume compensating chamber and the communication chamber so that the communication chamber is pressure compensated via the second volume compensating chamber in a mated state of the connector unit.

14. The method according to claim 13, further comprising:
moving a first moveable element and thus closing the first passageway between the first volume compensating chamber and the communication chamber preventing flow communication between the first volume compensating chamber and the communication chamber and subsequently,
moving an at least second moveable element and thus opening the second passageway between the second volume compensating chamber and the communication chamber thereby allowing flow communication between the second volume compensating chamber and the communication chamber so that the communication chamber is pressure compensated via the in the mated state of the connector unit.

15. The method according to claim 13,
wherein the first volume compensating chamber is pressure compensated against an ambient environment and comprises a contact support element that at least partly enters the second connector part of the connector unit during mating of the connector unit; wherein the second volume compensating chamber is pressure compensated against the ambient environment;
wherein the communication chamber is in flow communication with the first volume compensating chamber of the first connector part when the connector unit is in an unmated state; and wherein the communication chamber is in flow communication with the second volume compensating chamber of the second connector part when the connector unit is in the mated state; and
wherein the connector unit is configured such that during mating of the first connector part and the second connector part, flow communication between the communication chamber and the first volume compensating chamber of the first connector part is interrupted and the communication chamber is separated from the first volume compensating chamber by closing the first passageway and the communication chamber is brought into flow communication with the second volume compensating chamber of the second connector part by uncovering an aperture so that the second passageway and consequently the communication chamber is opened, so that the communication chamber is pressure compensated via the second volume compensating chamber in the mated state of the connector unit.

16. A connector unit comprising:
a first connector part and a second connector part; wherein the first connector part comprises at least a first volume compensating chamber that is pressure compensated against an ambient environment, and comprises at least one contact support element that at least partly enters the second connector part of the connector unit during mating of the connector unit; wherein the second connector part of the connector unit comprises at least a second volume compensating chamber that is pressure compensated against the ambient environment; and
a communication chamber that is in flow communication with the first volume compensating chamber of the first connector part when the connector unit is in an unmated state; and wherein the communication chamber is in flow communication with the second volume compensating chamber of the second connector part when the connector unit is in a mated state;
wherein the connector unit is configured such that during mating of the first connector part and the second connector part, flow communication between the communication chamber and the first volume compensating chamber of the first connector part is interrupted and the communication chamber is separated from the first volume compensating chamber by closing a first passageway and the communication chamber is brought into flow communication with the second volume compensating chamber of the second connector part by uncovering an aperture so that a second passageway and consequently the communication chamber is opened, so that the communication chamber is pressure compensated via the second volume compensating chamber in the mated state of the connector unit;
wherein the flow communication between the communication chamber and the first volume compensating chamber is interrupted by closing the first passageway connecting the first volume compensating chamber and the communication chamber during the mating of the first connector part and the second connector part; and
wherein the communication chamber is brought into flow communication with the second volume compensating chamber by opening the second passageway connecting the communication chamber and the second volume compensating chamber during the mating of the first connector part and the second connector part.

* * * * *